(12) United States Patent  
Kim

(10) Patent No.: US 12,185,693 B2  
(45) Date of Patent: Jan. 7, 2025

(54) AUTOMATIC PET EXCREMENT COLLECTION DEVICE

(71) Applicant: Jong Su Kim, Seongnam-si (KR)

(72) Inventor: Jong Su Kim, Seongnam-si (KR)

( * ) Notice: Subject to any disclaimer, the term of this patent is extended or adjusted under 35 U.S.C. 154(b) by 231 days.

(21) Appl. No.: 17/788,992

(22) PCT Filed: Dec. 29, 2020

(86) PCT No.: PCT/KR2020/095165  
§ 371 (c)(1),  
(2) Date: Jun. 24, 2022

(87) PCT Pub. No.: WO2021/137670  
PCT Pub. Date: Jul. 8, 2021

(65) Prior Publication Data  
US 2023/0035436 A1    Feb. 2, 2023

(30) Foreign Application Priority Data

Dec. 29, 2019  (KR) .......................... 10-2019-0177217  
Jun. 1, 2020   (KR) .......................... 10-2020-0065639

(51) Int. Cl.  
*A01K 1/01*        (2006.01)

(52) U.S. Cl.  
CPC .................................. *A01K 1/0135* (2013.01)

(58) Field of Classification Search  
CPC ........ A01K 1/0135; A01K 1/01; A01K 1/011; A01K 1/0117; A01K 29/00  
USPC .................................................. 119/163–170  
See application file for complete search history.

(56) References Cited

U.S. PATENT DOCUMENTS

| 4,376,365 A * | 3/1983 | Moertel ............... A01K 1/0117 53/391 |
| 6,974,029 B2 * | 12/2005 | Morand .............. B65B 67/1277 53/567 |
| 8,316,801 B1 * | 11/2012 | Nottingham ......... A01K 1/0117 119/169 |

(Continued)

FOREIGN PATENT DOCUMENTS

| CN | 109258487 A | * | 1/2019 |
| JP | 2005040016 A | * | 2/2005 |

(Continued)

*Primary Examiner* — Morgan T Jordan  
*Assistant Examiner* — Hae Rie Jessica Byun  
(74) *Attorney, Agent, or Firm* — NKL Law; Jae Youn Kim

(57) ABSTRACT

Proposed is an automatic pet excrement collection device including: a defecation plate; a defecation sheet supply part for continuously supplying defecation sheets on top of the defecation plate; a vinyl tube supply part for continuously supplying vinyl tubes, and supplying the vinyl tube so that the inlet thereof is opened toward the defecation plate, and thus the defecation sheet discharged from the defecation plate and pet excrement thereon can be inserted into the vinyl tube; a pressing roller means, for pressing the vinyl tube discharged rearward through the vinyl tube supply part so as to compress the pet excrement therein; and a vinyl tube collection part for collecting the vinyl tube having passed through the pressing roller means, the defecation sheet inserted therein, and the pet excrement compressed into a predetermined thickness.

11 Claims, 19 Drawing Sheets

(56) References Cited

U.S. PATENT DOCUMENTS

| | | | | |
|---|---|---|---|---|
| 8,408,160 B1 * | 4/2013 | Pozin | ................. | A01K 1/011 |
| | | | | 53/567 |
| 8,464,662 B1 * | 6/2013 | Shorenstein | ......... | A01K 1/0107 |
| | | | | 119/164 |
| 2003/0230579 A1 * | 12/2003 | Chomik | ............... | A47K 11/026 |
| | | | | 220/495.1 |
| 2004/0065265 A1 * | 4/2004 | Manera | ................ | A01K 1/0114 |
| | | | | 119/166 |
| 2007/0056520 A1 * | 3/2007 | Hamada | ............... | A01K 1/0114 |
| | | | | 119/161 |
| 2009/0241850 A1 * | 10/2009 | Campbell | ............ | A01K 1/0117 |
| | | | | 119/164 |
| 2010/0175626 A1 | 7/2010 | Askinasi | | |
| 2014/0311414 A1 * | 10/2014 | Morris | ................ | A01K 1/0117 |
| | | | | 119/161 |
| 2016/0007560 A1 * | 1/2016 | Roofener | ............ | A01K 1/0117 |
| | | | | 119/164 |
| 2016/0278338 A1 * | 9/2016 | Bin | ...................... | A01K 1/0117 |
| 2017/0347619 A1 * | 12/2017 | Cook | ................... | A01K 1/0117 |
| 2018/0325073 A1 * | 11/2018 | Choi | .................... | A01K 1/0117 |
| 2020/0359594 A1 * | 11/2020 | Tohara | ................ | A01K 1/0117 |

FOREIGN PATENT DOCUMENTS

| | | | | | |
|---|---|---|---|---|---|
| JP | | 2018023376 | A * | 2/2018 | |
| KR | 10-2019-0117398 | A | | 10/2019 | |
| KR | | 20190117398 | A * | 10/2019 | |
| WO | | WO-8300980 | A1 * | 3/1983 | |
| WO | | WO-2009014335 | A2 * | 1/2009 | ........... A01K 1/0107 |

* cited by examiner

AUTOMATIC PET EXCREMENT COLLECTION DEVICE

TECHNICAL FIELD

The present invention relates to an automatic pet excrement collection device, and more particularly, to an automatic, pet excrement collection device which allows a defecation sheet laid on a defecation plate and pet excrement thereon to be inserted into a vinyl tube and then to be wound together tube, and is thus convenient to use and hygienic.

BACKGROUND ART

A defecation pad is used to collect pet excrement. Such a defecation pad contaminated pet excrement needs to be thrown into a trash can whenever a pet defecates on the defecation pad, thus causing inconvenience.

Further, the pet excrement is exposed to the air and may thus contaminate indoor air. Particularly, when a pet owner leaves a house empty for a long time, it is impossible to replace the defecation pad, and thus indoor air may be severely contaminated.

In order to solve such a problem, an automatic pet excrement collection device which automatically changes a defecation sheet for pets has been developed. The conventional automatic pet excrement collection device includes a defecation plate, a defecation sheet supply case provided at one side of the defecation plate, a defecation sheet collection case provided at the other side of the defecation plate and configured to collect the defecation sheet, and a winding roller configured to wind the defecation sheet laid on the defecation plate.

The above conventional automatic, pet excrement collection device discharges the defecation sheet together with the pet excrement by horizontally moving the defecation sheet whenever a pet defecates on the defecation sheet, and simultaneously lays a new defecation sheet on the defecation plate, thereby being capable of keeping an indoor environment clean.

However, since the contaminated defecation sheet and the pet excrement are intactly wound on the outer circumferential surface of the winding roller, the conventional automatic pet excrement collection device has a problem that the pet excrement or a bad smell thereof leak to the outside through both surfaces of the winding roller.

DISCLOSURE

Technical Problem

Therefore, the present invention has been made in view of the above problems, and it is an object of the present invention to provide an automatic pet excrement collection device which allows a contaminated defecation sheet and pet excrement thereon to be inserted into a vinyl tube and then to be wound together with the vinyl tube, so as to prevent the excrement and a bad smell thereof from leaking to the outside.

Technical Solution

In accordance with an aspect of the present invention, the above and other objects can be accomplished by the provision of an automatic pet excrement collection device including, a defecation plate formed to have a designated size; a defecation sheet discharged from one side to a remaining side of the defecation plate so as to be laid on an upper surface of the defecation plate; a defecation sheet supply unit configured to continuously supply the defecation sheet toward the upper surface of the defecation plate; a vinyl tube installed at the remaining side of the defecation plate; a vinyl tube supply unit configured to continuously supply the vinyl tube so that an inlet of the vinyl tube is opened toward the defecation plate, and thus the defecation sheet discharged from the one side to the remaining side of the defecation plate and pet excrement placed on an upper surface of the defecation sheet can be inserted into the vinyl tube; a pressing roller means configured to press the vinyl tube discharged rearwards through the vinyl tube supply unit so as to compress the pet excrement placed in the vinyl tube; and a vinyl tube collection unit configured to collect the vinyl tube having passed through the pressing roller means, and the defecation sheet and the pet excrement compressed to a designated thickness, inserted into the vinyl tube.

The defecation sheet supply unit may include a defecation sheet block configured such that the defecation sheet is folded at every fixed length in zigzag and is vertically stacked, and a defecation sheet block receipt case configured to receive the defecation sheet block.

The defecation sheet supply unit may include a defecation sheet supply roll formed by winding the defecation sheet around a supply roll, and a defecation sheet supply roll receipt case configured to receive the defecation sheet block.

The defecation sheet block receipt case may be installed horizontally under the defecation plate.

The defecation sheet may be installed vertically on the one side of the defecation plate.

The vinyl tube supply unit may include a vinyl tube block configured such that the vinyl tube is folded at every fixed length in zigzag and is vertically stacked, and a vinyl tube block receipt member configured to receive the vinyl tube block.

The vinyl tube may be formed in a tube type including an upper sheet and a lower sheet, both sides thereof being connected to each other, and the vinyl tube block may include a stack including an upper stack part configured such the upper sheet is stacked to a designated height, a lower stack part configured such that the lower sheet is stacked to the designated height, and side stack parts formed at both sides of the upper stack part and the lower stack part; a hollow part formed among the upper stack part, the lower stack part and the side stack parts so as to have a sufficient size to allow the vinyl tube and the defecation sheet to pass therethrough; and a withdrawal part formed by withdrawing the vinyl tube, withdrawn from the stack, rearwards to a designated length through the hollow part.

The defecation sheet discharged from the one side to the remaining side of the defecation plate may be inserted into the vinyl tube withdrawn from the stack and passing through the hollow part, and may be coupled to a front end of the vinyl tube after passing through the hollow part together with the vinyl tube.

The vinyl tube collection unit may include a winding roller configured to fix a front end of the vinyl tube and a front end of the defecation sheet inserted thereinto, and installed to be rotatable in a horizontal direction so as to wind the vinyl tube, and the defecation sheet and the pet excrement compressed to the designated thickness, inserted thereinto on the outer circumferential surface of the winding roller.

The vinyl tube block receipt member may include a hollow passage formation part configured to extend to a designated length so as to be inserted into the hollow part of the vinyl tube block, and to form a hollow passage in the hollow passage formation part such that the vinyl tube, the defecation sheet and the pet excrement placed thereon pass through the hollow passage.

The hollow passage formation part may include an upper support configured to receive and support the upper stack part of the vinyl tube block, a lower support configured to receive and support the lower stack part and side supports configured to receive and support the side stack parts, and the hollow passage may be formed among the upper support, the lower support and the side supports so as to have a sufficient size to allow the vinyl tube and the defecation sheet to pass therethrough.

The automatic pet excrement collection device may further include a rear support plate vertically installed integrally with rear ends of the upper support, the lower support and the side supports, and a bottom support plate horizontally installed so as to be spaced downwards apart from the hollow passage formation part by a designated distance.

An opening configured to partially open the upper surface of the hollow passage may be further formed in each of the hollow passage formation part and the rear support plate.

In accordance with another aspect of the present invention, there is provided an automatic pet excrement collection device including a defecation plate formed to have a designated size; a defecation sheet discharged from one side to a remaining side of the defecation plate so as to be laid on an upper surface of the defecation plate; a defecation sheet supply unit configured to continuously supply the defecation sheet toward the upper surface of the defecation plate; a main body case coupled to the remaining side of the defecation plate and configured to form an inner space having a designated size; a vinyl tube installed in a horizontal direction so as to face the defecation plate; a vinyl tube supply unit detachably installed in the main body case and configured to continuously supply the vinyl tube so that an inlet of the vinyl tube is opened toward the defecation plate, and thus the defecation sheet discharged from the one side to the remaining side of the defecation plate and pet excrement placed on the defecation sheet can be inserted into the vinyl tube; a pressing roller means detachably installed in the main body case and including at least one pressing roller configured to press the vinyl tube discharged rearwards through the vinyl tube supply unit so as to compress the pet excrement inserted into the vinyl tube to a designated thickness or less; a vinyl tube collection unit rotatably installed in the main body case and including a winding roller configured to wind the vinyl tube having passed through the pressing roller means, and the defecation sheet and the pet excrement compressed to the designated thickness or less, inserted into the vinyl tube; and a driving means installed in the main body case and configured to rotate the winding roller and the at least one pressing roller.

The defecation sheet may have a sufficient size to cover the upper surface of the defecation plate, and may be formed as a composite sheet having water absorption and water proofness, and the vinyl tube may be formed as a water-impermeable tube-type vinyl sheet including an upper sheet and a lower sheet.

The defecation sheet supply unit may include a defecation sheet block configured such that the defecation sheet is folded at every fixed length in zigzag and is vertically stacked, and a defecation sheet block receipt case configured to receive the defecation sheet block; and the vinyl tube supply unit may include a vinyl tube block configured such that the vinyl tube is folded at every fixed length in zigzag and is vertically stacked, and a vinyl tube block receipt member configured to receive the vinyl tube block.

The vinyl tube block may include a stack including an upper stack part configured such the upper sheet is stacked to a designated height, a lower stack part configured such that the lower sheet is stacked to the designated height, and side stack parts formed at both sides of the upper stack part and the lower stack part to have the designated height; a hollow part formed among the upper stack part, the lower stack part and the side stack parts so as to have a sufficient size to allow the vinyl tube, the defecation sheet inserted thereinto and the pet excrement placed thereon to pass therethrough; and a withdrawal part formed by withdrawing the vinyl tube, withdrawn from the stack, rearwards to a designated length through the hollow part.

The defecation sheet block receipt case may be a rectangular housing installed under the defecation plate and having a sufficient size to receive the defecation sheet block, and may include a bottom plate having a designated size and a plurality of vertical plates, an outlet configured to discharge the defecation sheet withdrawn from the defecation sheet block therethrough may be formed in one vertical plate, guide rollers configured to guide the defecation sheet discharged through the outlet to the upper surface of the defecation plate may be installed in an upper region outside the outlet, and a pressing protrusion configured to press the upper surface of the defecation sheet discharged through the outlet may be formed on the lower surface of the defecation plate so as to extend downwards to a designated length.

The main body case may include a lower case configured to form an inner space having a designated size, an upper case installed on the lower case so as to close the upper end of the lower case, and an inner case installed in the lower case so as to divide the inner space, and an entrance configured such that the defecation sheet discharged from the defecation plate and the pet excrement placed thereon are introduced thereinto may formed through the front surface of the main body case.

The vinyl tube block receipt member may include a hollow passage formation part configured to extend forwards to a designated length so as to be inserted into the hollow part of the vinyl tube block, and to form a hollow passage in the hollow passage formation part so as to have a sufficient size to allow the vinyl tube, the defecation sheet and the pet excrement placed thereon to pass therethrough; a rear support plate vertically installed integrally the rear end of the hollow passage formation part and having an opening corresponding to the hollow passage and both side surfaces fixed to the lower case; and a bottom support plate horizontally installed so as to be spaced downwards apart from the hollow passage formation part by a designated distance.

The pressing roller means may include a pressing roller main body detachably installed in the main body case, at least one upper pressing roller rotatably installed at the lower end of the pressing roller main body so as to press the vinyl tube, and a lower pressing roller rotatably installed on a frame installed in the lower case so as to correspond to the upper pressing roller, and configured such that the upper end of the lower pressing roller is exposed through an opening formed in the inner case.

A sealing roller configured to press the vinyl tube having passed through the upper pressing roller so as to seal the inside of the vinyl tube may be further installed at the lower end of the pressing roller main body.

The defecation plate may be a porous plate, the defecation sheet laid on the upper surface of the defecation plate may be formed of a porous material so that pet urine is discharged thereunder, and a urine collection box configured to collect the pet urine and to wash the pet urine off using washing water is provided under the defecation plate.

In accordance with a further aspect of the present invention, there is provided an automatic pet excrement collection device including a defecation plate formed to have a designated size; a defecation sheet discharged from one side to a remaining side of the defecation plate so as to be laid on an upper surface of the defecation plate; a defecation sheet supply unit including a defecation sheet block configured such that the defecation sheet is folded at every fixed length in zigzag and is vertically stacked so as to continuously supply the defecation sheet toward the upper surface of the defecation plate; and a defecation sheet block receipt case configured to receive the defecation sheet block; a main body case coupled to the remaining side of the defecation plate and configured to form an inner space having a designated size; a vinyl tube installed in a horizontal direction to face the defecation plate so that the defecation sheet discharged from the one side to the remaining side of the defecation plate and pet excrement placed thereon can be inserted into the vinyl tube; a vinyl tube supply unit installed in the main body case, and including a vinyl tube block configured such that the vinyl tube is folded at every fixed length in zigzag and is vertically stacked, and a vinyl tube block receipt member configured to receive the vinyl tube block and to continuously supply the vinyl tube so that an inlet of the vinyl tube is opened toward the remaining side of the defecation plate, and thus the defecation sheet discharged from the one side to the remaining side of the defecation plate and the pet excrement placed on the defecation sheet can be inserted into the vinyl tube; a transfer means configured to pull upwards the vinyl tube discharged rearwards through the vinyl tube supply unit, and the defecation sheet and the pet excrement inserted into the vinyl tube so as to transfer the vinyl tube, the defecation sheet and the pet excrement to a designated height; a pressing and guiding means configured to press the vinyl tube withdrawn rearwards from the vinyl tube supply unit so as to compress the pet excrement inserted thereinto to a designated thickness, and to transfer the vinyl tube, and the defecation sheet and the pet excrement inserted into the vinyl tube in an upward direction; a vinyl tube collection box installed under the transfer means and formed in a designated size such that the vinyl tube discharged from the transfer means is put into the vinyl tube collection box; and a garbage bag installed in the vinyl tube collection box and provided with an opened inlet so that the vinyl tube discharged from the transfer means is put thereinto.

The transfer means may include transfer rollers including an upper transfer roller and a lower transfer roller installed so as to face each other vertically; and a guide partition vertically installed in the main body case and configured such that the lower transfer roller is rotatably installed at the lower end of the guide partition and a plurality guide rollers is rotatably installed at the middle portion of the guide partition, and the pressing and guiding means may include a pressing roller main body detachably installed in the main body case so as to correspond to the guide partition, an upper pressing roller rotatably installed at the lower end of the pressing roller main body and configured to press the vinyl tube so as to compress the pet excrement placed therein, the upper transfer roller rotatably installed at the upper end of the pressing roller main body so as to correspond to the lower transfer roller, and the plurality guide rollers rotatably installed at the middle portion of the guide partition and configured to press and guide the vinyl tube transferred along the guide partition.

The garbage bag may be a tube-type garbage bag, a garbage bag block configured such that the garbage bag is folded at every fixed length in zigzag and is laterally stacked so as to continuously supply the garbage bag, and a garbage bag block receipt member configured to receive the garbage bag block are installed above the vinyl tube collection box, the garbage bag withdrawn from the garbage bag block may be inserted into the vinyl tube collection box through a hollow passage formed at the center of the garbage bag block receipt member, and the vinyl tube discharged by the transfer rollers, the defecation sheet and the pet excrement inserted into the vinyl tube may be put into the garbage bag.

A cutting means configured to cut the vinyl tube and the defecation sheet inserted thereinto may be further provided between the transfer means and the vinyl tube collection box.

Advantageous Effects

According to the present invention, the contaminated defecation sheet and the pet excrement placed thereon are put into the vinyl tube, and then, the vinyl tube and the defecation sheet and the pet excrement inserted into the vinyl tube are wound, thereby being capable of preventing contamination of the device with the excrement or leakage of the excrement or a smell thereof to the outside.

Further, according to the present invention, the contaminated defecation sheet and the pet excrement placed thereon are put into the vinyl tube, and then, the vinyl tube is pressed by the pressing roller so that the pet excrement inserted into the vinyl tube is compressed to a designated thickness, thereby being capable of allowing the vinyl tube and the defecation sheet and the pet excrement inserted into the vinyl tube to be smoothly wound on the outer circumferential surface of the winding roller, uniformly increasing the diameter of an acquired vinyl tube winding roll, and thus smoothly transferring the defecation sheet and the vinyl tube.

BEST MODE

Advantages and features of the present disclosure and methods for achieving the same will become apparent from the descriptions of aspects herein below with reference to the accompanying drawings. In the following description of the present invention, a detailed description of known functions and configurations incorporated herein will be omitted when it may make the subject matter of the present invention rather unclear. Also, the terms used in the following description are terms defined taking into consideration the functions obtained in accordance with the present invention, the definitions of these terms should be determined based on the whole content of this specification describing an automatic pet excrement collection device according to the present invention because they may be changed in accordance with the option of a user or operator or a usual practice.

Figure 1:
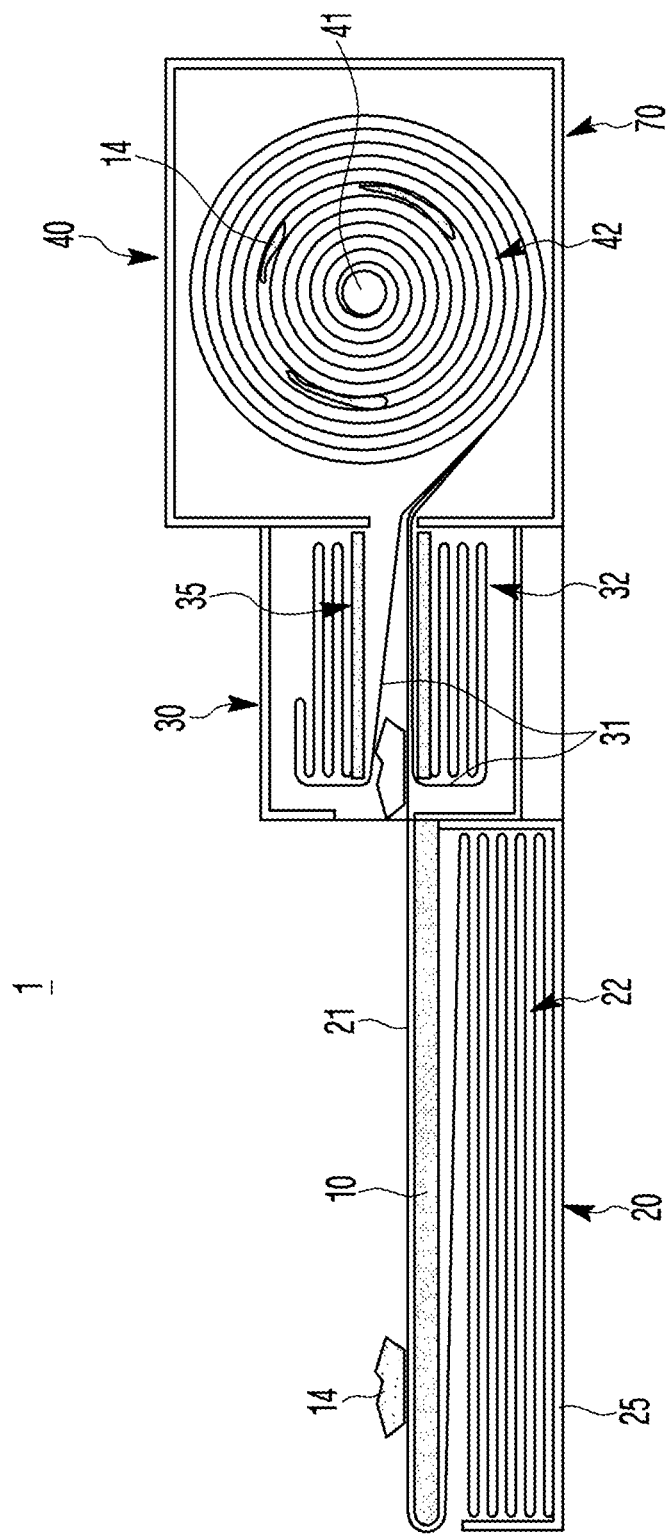
FIG. 1 is a cross-sectional view showing an automatic pet excrement collection device according to an exemplary embodiment of the present invention.

FIG. 1 is a cross-sectional view schematically showing an automatic pet excrement collection device 1 according to the present invention.

The automatic pet excrement collection device 1 according to the present invention automatically collects a defecation sheet 21 laid on the upper surface of a defecation plate 10 and pet excrement 14 placed thereon, and includes the defecation plate 10 formed to have a designated size, a defecation sheet supply unit 20 configured to continuously supply the defecation sheet 21 to the upper surface of the defecation plate 10, a vinyl tube supply unit 30 configured to continuously supply a vinyl tube 31 installed such that the contaminated defecation sheet 21 discharged from the defecation plate 10 can be inserted thereinto, and a vinyl tube collection unit 40 configured to collect the vinyl tube 31 discharged from the vinyl tube supply unit 30 and the defecation sheet 21 and the pet excrement 14 inserted thereinto.

The defecation plate 10 is formed as a flat plate having a designated size and thickness so that a pet is placed on the defecation plate 10 and discharges the excrement 14, and the defecation sheet 21 is formed as a non-fabric sheet having a sufficient size and shape to cover the upper surface of the defecation plate 10.

The defecation sheet supply unit 20 includes a defecation sheet block 22 configured such that the defecation sheet 21 is folded at every fixed length in zigzag and is vertically stacked so as to continuously supply the defecation sheet 21, and a defecation sheet block receipt case configured to receive the defecation sheet block 22.

The vinyl tube 31 is a tube-type vinyl sheet, and is formed to have a sufficient size and shape to allow the defecation sheet 21 horizontally transferred on the defecation plate 10 to be inserted thereinto. The vinyl tube supply unit 30 includes a vinyl tube block 32 configured such that the vinyl tube 31 is folded at every fixed length in zigzag and is vertically stacked so as to continuously supply the vinyl tube 31, and a vinyl tube block receipt member 35 configured to receive the vinyl tube block 32.

The vinyl tube collection unit 40 includes a winding roller 41 configured to wind the vinyl tube 31 discharged from the vinyl tube supply unit 30 and the defecation sheet 21 and the pet excrement 14 inserted thereinto, a vinyl tube winding roll 42 wound on the outer circumferential surface of the winding roller 41, and a main body case 70 configured to receive the vinyl tube winding roll 42.

Figure 2:
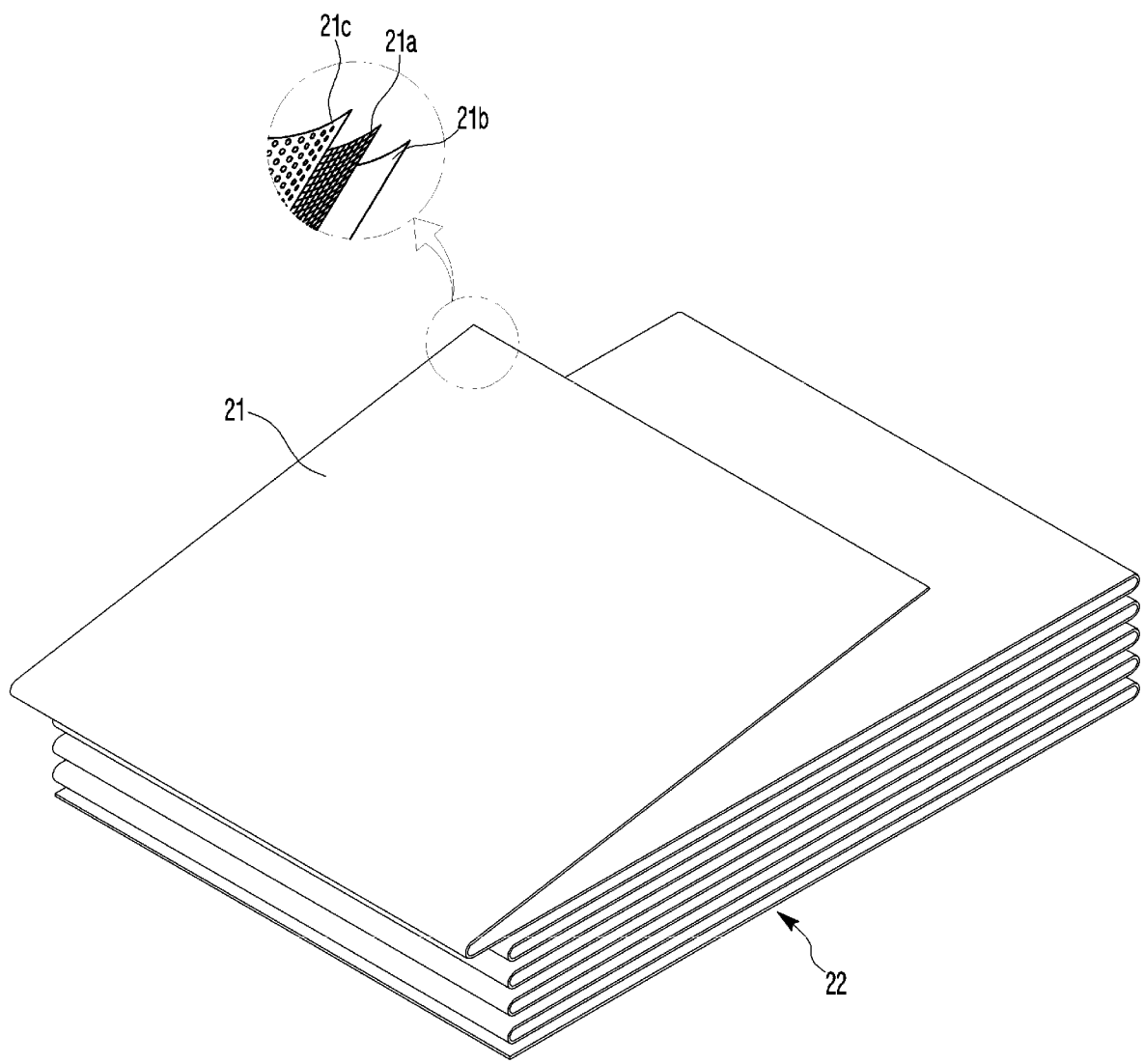
FIG. 2 is a perspective view showing a defecation sheet and a defecation sheet block according to the present invention.

Concretely, the defecation sheet 21 has a sufficient size to cover the upper surface of the defecation plate 10, and is formed as a composite sheet which prevents the defecation plate 10 from being contaminated with the pet excrement 14, as shown in FIG. 2. For example, the defecation sheet 21 may include a water absorbent sheet 21a configured to absorb pet urine, and a waterproof sheet 21b configured to prevent the pet urine from leaking downwards and thus contaminating the defecation plate 10. Further, a porous vinyl sheet 21c may be further installed on the upper surface of the water absorbent sheet 21a, and the water absorbent sheet 21a may include a polymer material which absorbs moisture. Preferably, the defecation sheet 21 may have a length of 10-20 cm.

The defecation sheet block 22 is a rectangular block formed to have a designated height and area by folding the defecation sheet 21 at every fixed length in zigzag so as to be vertically stacked. For example, the defecation sheet 21 may be folded at every length similar to the length of the defecation plate 10 in zigzag.

Figure 3:
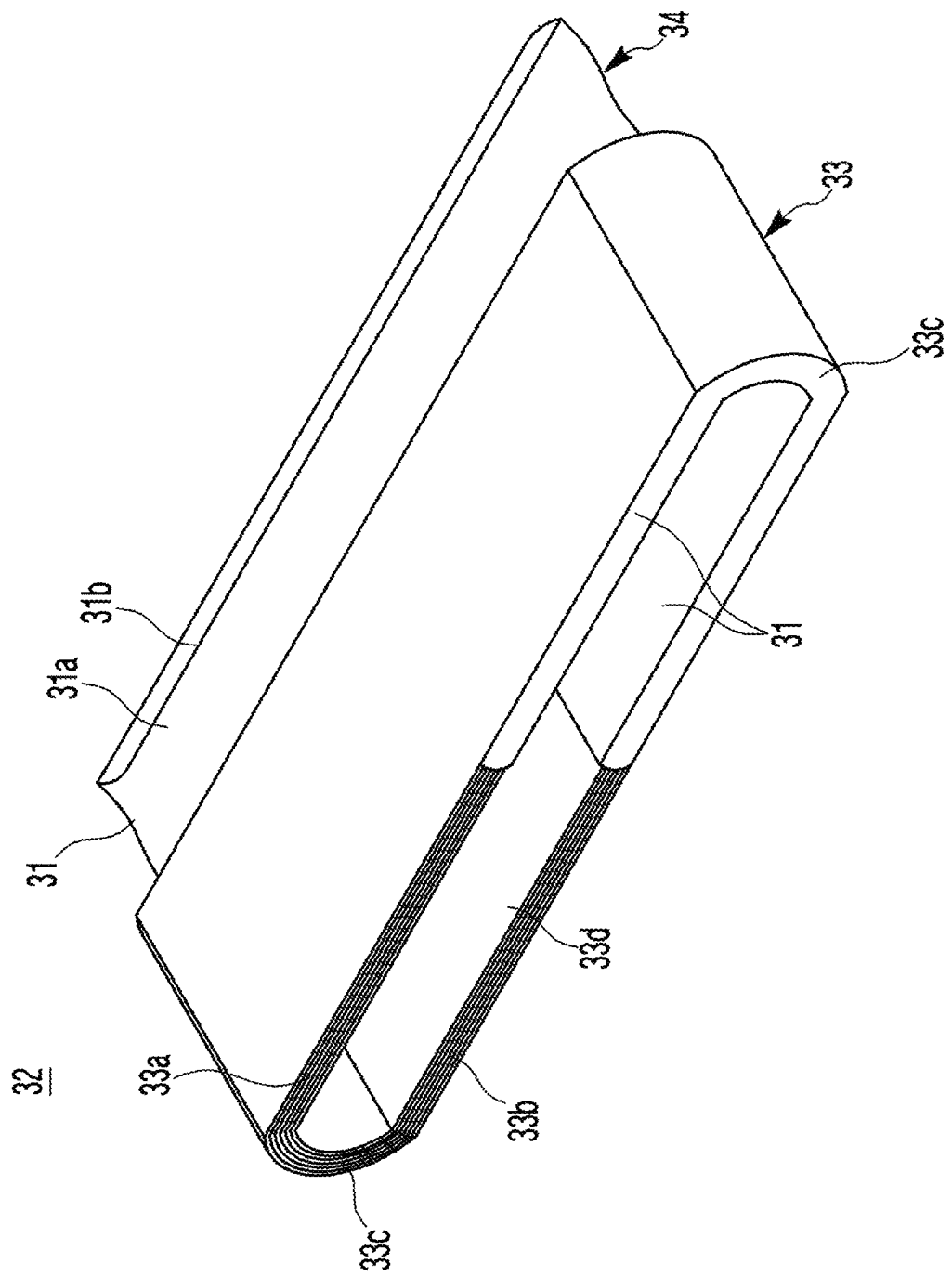
FIG. 3 is a perspective view showing a vinyl tube and a vinyl tube block according to the present invention.

The vinyl tube 31 is a tube-type vinyl sheet, and includes an upper sheet 31a and a lower sheet 31b, and both sides of the upper sheet 31a and the lower sheet 31b are connected to each other, as shown in FIG. 3. A hollow is formed in the vinyl tube 31 so that the defecation sheet 21 is inserted thereinto. The length of the vinyl tube 31 is the same as the length of the defecation sheet 21.

The vinyl tube block 32 serves to continuously supply the vinyl tube 31, and is a rectangular block formed by folding the vinyl tube 31 at every fixed length in zigzag so as to be vertically stacked. Preferably, the vinyl tube block 32 includes a stack 33 including an upper stack part 33a configured such the upper sheet 31a of the vinyl tube 31 is stacked to a designated height, a lower stack part 33b configured such that the lower sheet 31b of the vinyl tube 31 is stacked to the designated height, and side stack parts 33c formed at both sides of the upper stack part 33a and the lower stack part 33b.

Further, a hollow part 33d is formed at the center of the stack 33. The hollow part 33d is formed among the upper stack part 33a, the lower stack part 33b and the side stack parts 33c so as to have a sufficient size to allow the vinyl tube 31 and the defecation sheet 21 to pass therethrough. Further, a withdrawal part 34 is formed at the rear of the stack 33 by withdrawing the vinyl tube 31 having passed through the hollow part 33b rearwards to a designated length. Preferably, the withdrawal part 34 is formed by withdrawing a part of the vinyl tube 31 located at the outermost part of the stack 33 through the front surface of the stack 33 and then withdrawing the part of the vinyl tube 31 rearwards to the designated length via the hollow part 33d.

Figure 4:
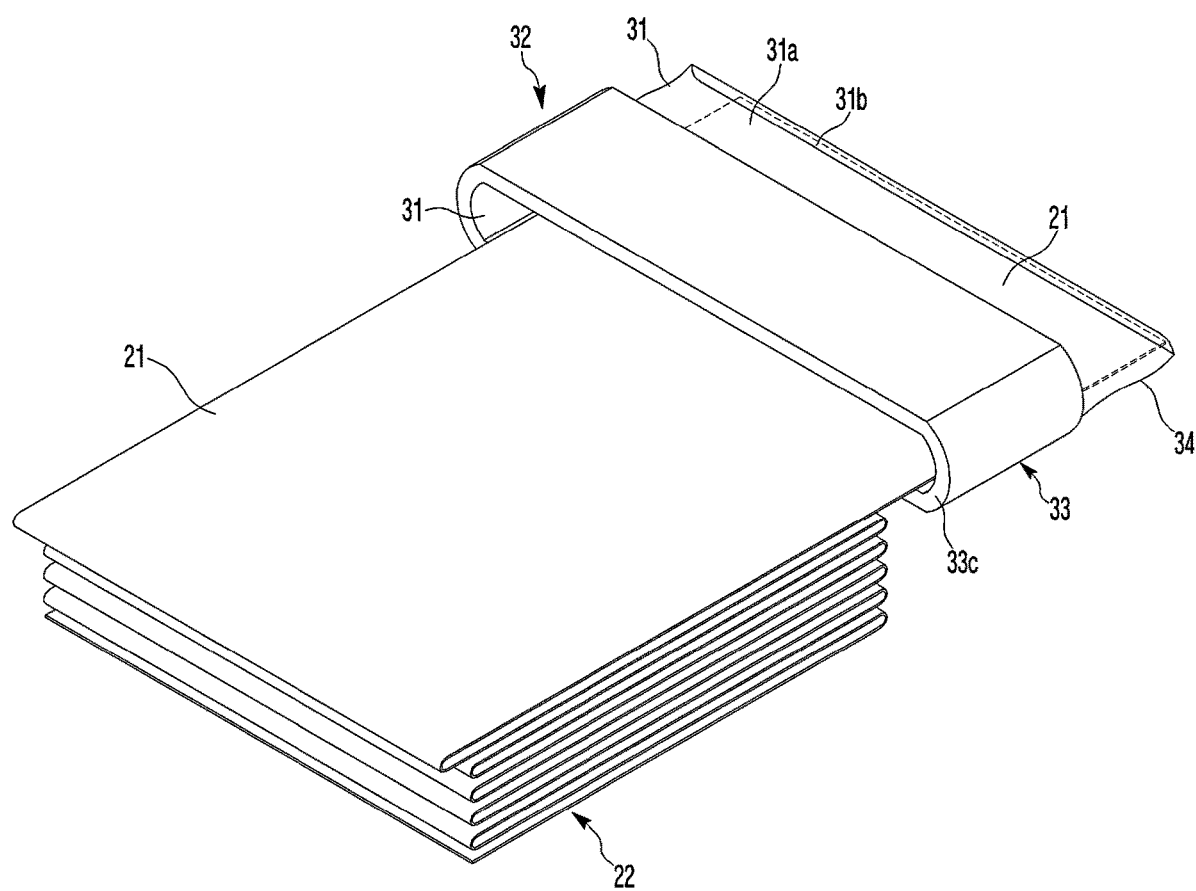
FIG. 4 is a perspective view showing coupling relationships between the defecation sheet block and the vinyl tube block (or cartridge) according to the present invention.

As shown in FIG. 4, the defecation sheet block 22 and the vinyl tube block 32 may be provided in the state in which they are coupled to each other. That is, the defecation sheet block 22 and the vinyl tube block 32 are arranged in a row, and the vinyl tube block 32 is installed so that the inlet thereof is opened toward the defecation plate 10 by withdrawing the part of the vinyl tube 31 located at the outermost part of the stack 33 through the front surface of the stack 33 and then inserting the part of the vinyl tube 31 into the hollow part 33d. Further, the front end of the defecation sheet 21 withdrawn from the defecation sheet block 22 is inserted into the hollow part 33d of the vinyl tube block 32 through the inlet of the vinyl tube 31. The vinyl tube 31 and the defecation sheet 21 inserted thereinto pass through the hollow part 33d and are withdrawn rearwards to a designated length. The front ends of the vinyl tube 31 and the defecation sheet 21 are coupled to each other. Then, the front end of the vinyl tube 31 may be sealed. Further, the winding roller 41 formed of a paper tube is coupled to the front ends of the vinyl tube 31 and the defecation sheet 21.

Referring again to FIG. 1, the defecation sheet block 22 is received in the defecation sheet block receipt case 25 detachably installed under the defecation plate 10, and the vinyl tube block 32 is received in the vinyl tube block receipt member 35 detachably installed in the main body case 70.

The defecation sheet block receipt case 25 is a rectangular housing formed to have a sufficient size to receive the defecation sheet block 22, and includes a bottom plate 25a having a designated size and a plurality of vertical plates 25b. The defecation sheet 21 withdrawn from the defecation sheet block 22 is laid on the upper surface of the defecation plate 10.

The vinyl tube block receipt member 35 includes a hollow passage formation part 36 inserted into the hollow part 33d formed in the vinyl tube block 32. Further, the hollow passage formation part 36 is formed to have a shape and size which can be inserted into the hollow part 33d of the vinyl tube block 32. Further, a receipt space configured to receive the stack 33 of the vinyl tube block 32 is formed outside the hollow passage formation part 36, and a hollow passage 36d into which the defecation sheet 21 withdrawn from the vinyl tube block 32 is inserted into the receipt space is formed in the hollow passage formation part 36.

The defecation sheet 21 discharged from the upper surface of the defecation plate 10 is inserted into the vinyl tube 31 passing through the hollow passage 36d of the vinyl tube block receipt member 35, and the vinyl tube 31 and the defecation sheet 21 inserted thereinto are withdrawn rearwards to a designated length.

Therefore, when the winding roller 41 is rotated in the horizontal direction, the vinyl tube 31 and the defecation sheet 21 are pulled rearwards while being wound on the outer circumferential surface of the winding roller 41. Then, the defecation sheet 21 withdrawn from the defecation sheet block 22 is supplied toward the upper surface of the defecation plate 10, and the defecation sheet block 22 laid on the defecation plate 10 is horizontally moved. Further, the vinyl tube 31 withdrawn from the vinyl tube block 32 is inserted into the hollow passage 36d of the vinyl tube block receipt member 35, and thus, the inlet of the vinyl tube 31 is opened toward the defecation plate 10. Then, the defecation sheet 21 discharged from the defecation plate 10 and the pet excrement 14 thereon are inserted into the vinyl tube 31, pass through the hollow passage 36d of the vinyl tube block receipt member 35, and are withdrawn rearwards. Further, the vinyl tube 31 withdrawn rearwards and the defecation sheet 21 and the excrement 14 inserted thereinto are wound on the winding roller 41. Thereby, the vinyl tube winding roll 42 is formed on the outer circumferential surface of the winding roller 41.

As described above, the automatic pet excrement collection device 1 according to the present invention inserts the contaminated defecation sheet 21 and the pet excrement 14 into the vinyl tube 31 formed of a water-impermeable material, and winds the defecation sheet 21 and the excrement 14 together with the vinyl tube 31, thereby being capable of preventing the excrement and a smell thereof from leaking to the outside.

FIGS. 5 to 8 are views showing one embodiment of the automatic pet excrement collection device according to the present invention.

First, the automatic pet excrement collection device 1 according to this embodiment includes a defecation plate 10 provided in a designated size, a defecation sheet 21 discharged from one side to the other side of the defecation plate so as to be laid on the upper surface of the defecation plate, a defecation sheet supply unit 20 configured to continuously supply the defecation sheet to the upper surface of the defecation plate, a main body case 70 coupled to the other side of the defecation plate and configured to form an inner space having a designated size, a vinyl tube 31 installed in the horizontal direction so as to face the defecation plate, a vinyl tube supply unit 30 detachably installed in the main body case and configured to continuously supply the vinyl tube so that the inlet thereof is opened toward the defecation plate and thus the defecation sheet discharged from one side to the other side of the defecation plate and pet excrement placed thereon are inserted into the vinyl tube, a pressing roller means 60 detachably installed in the main body case and including at least one pressing roller configured to press the vinyl tube discharged rearward through the vinyl tube supply unit so as to compress the pet excrement into the vinyl tube to a designated thickness or less, a winding roller 41 rotatably installed in the main body case and configured to wind the vinyl tube having passed through the pressing roller means and the defecation sheet and the pet excrement compressed to the designated thickness, inserted into the vinyl tube, and a driving means 50 installed in the main body case and configured to rotate the winding roller and the at least one pressing roller.

Figure 5:
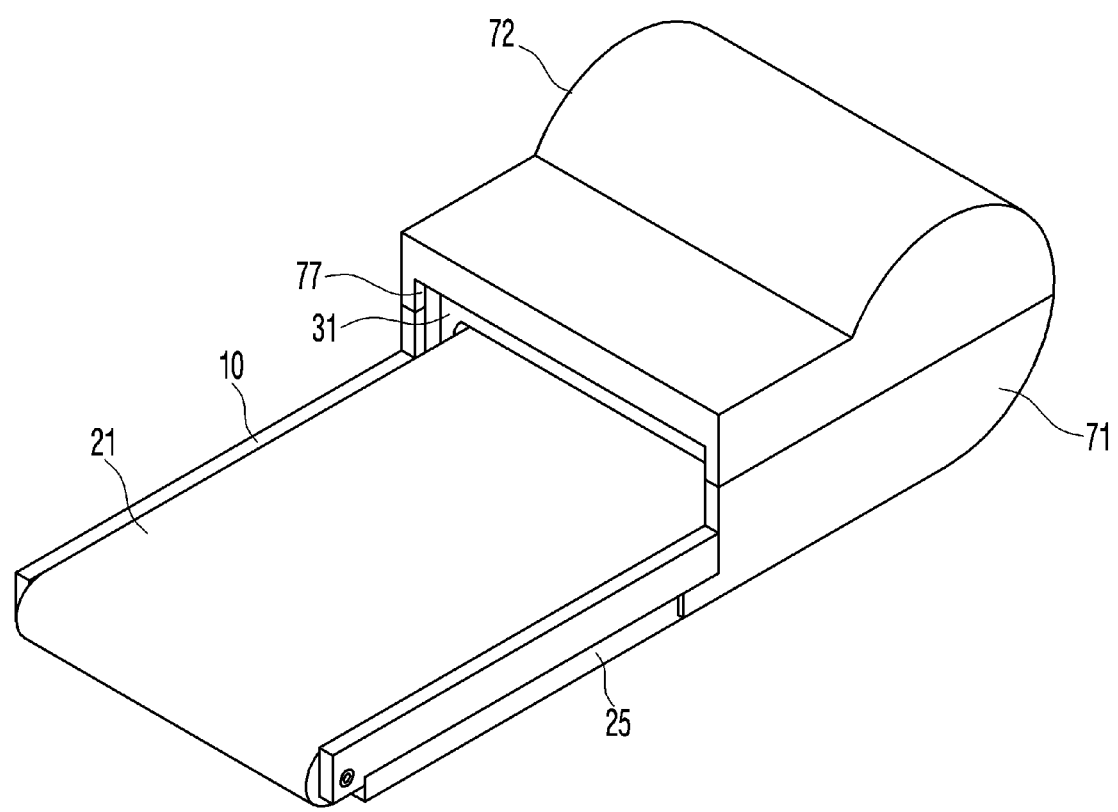
FIG. 5 is a perspective view showing one embodiment of the automatic pet excrement collection device according to the present invention.

As shown in FIG. 5, an entrance 77 having a designated size is formed through the front surface of the main body case 70 so that the defecation sheet 21 and the excrement 14 placed thereon may be inserted into the vinyl tube 31 through the entrance 77.

Figure 6:
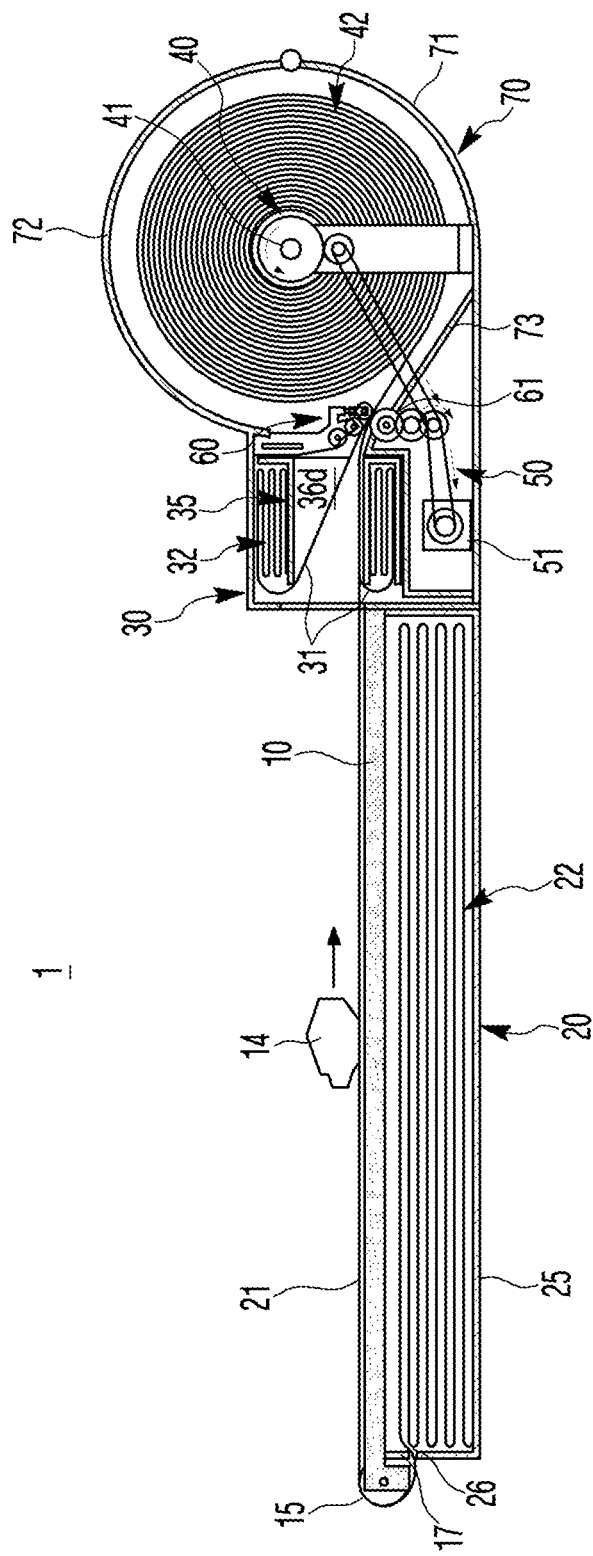
FIG. 6 is a cross-sectional view of the automatic pet excrement collection device shown in FIG. 1.
Figure 7:
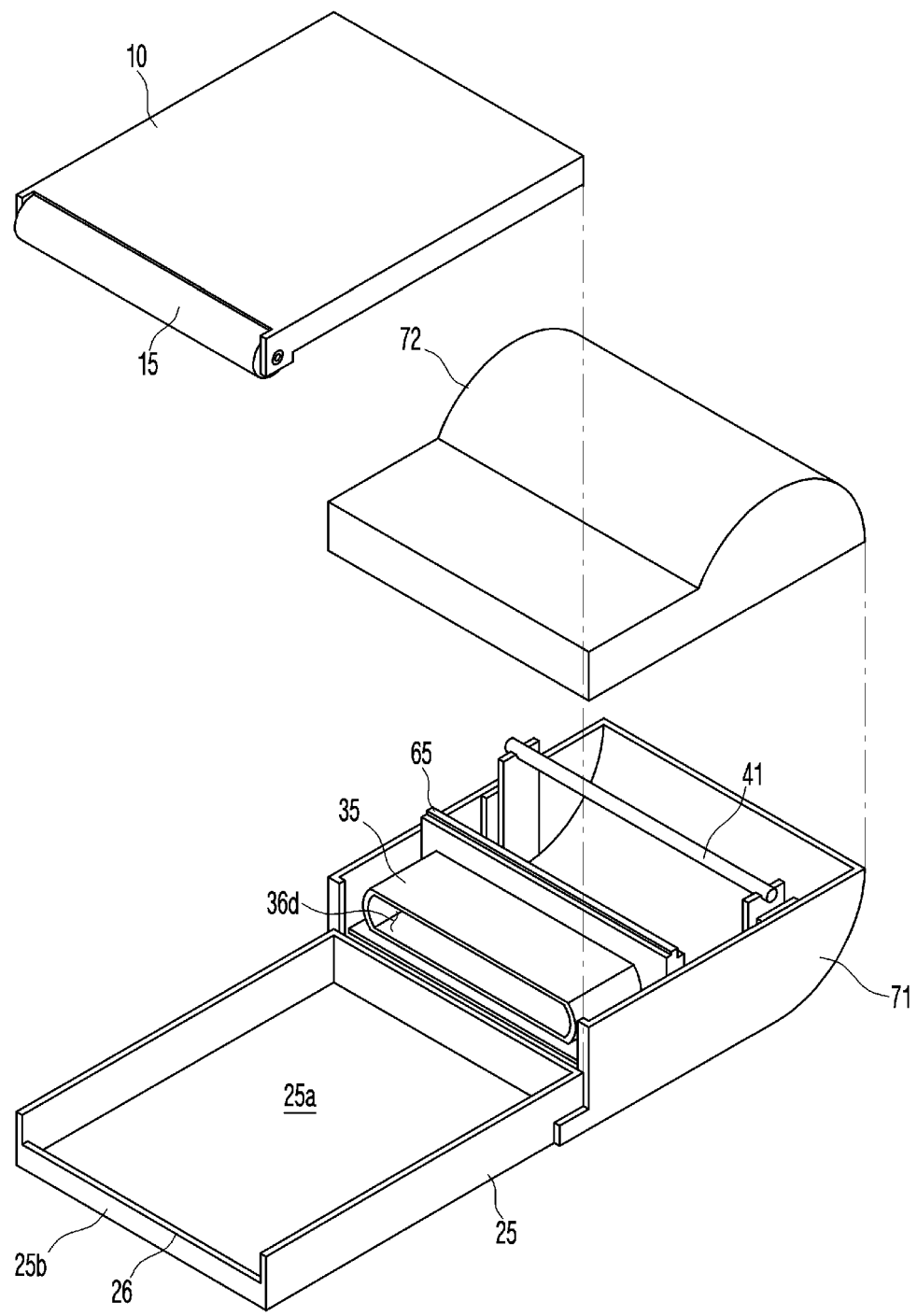
FIG. 7 is an exploded perspective view of the automatic pet excrement collection device shown in FIG. 6.

Referring to FIGS. 6 and 7, a vinyl tube block receipt member 35 configured to receive a vinyl tube block 32 is installed in the main body case 70. The vinyl tube block receipt member 35 has a hollow passage formation part 36 inserted into a hollow part 33d formed in the vinyl tube block 32, and a hollow passage 36d is formed in the hollow passage formation part 36 so as to allow the vinyl tube 31 withdrawn from the vinyl tube block 32 to be withdrawn rearwards. Further, a receipt space configured to receive a stack 33 of the vinyl tube block 32 is formed around the hollow passage formation part 36.

Figure 8:
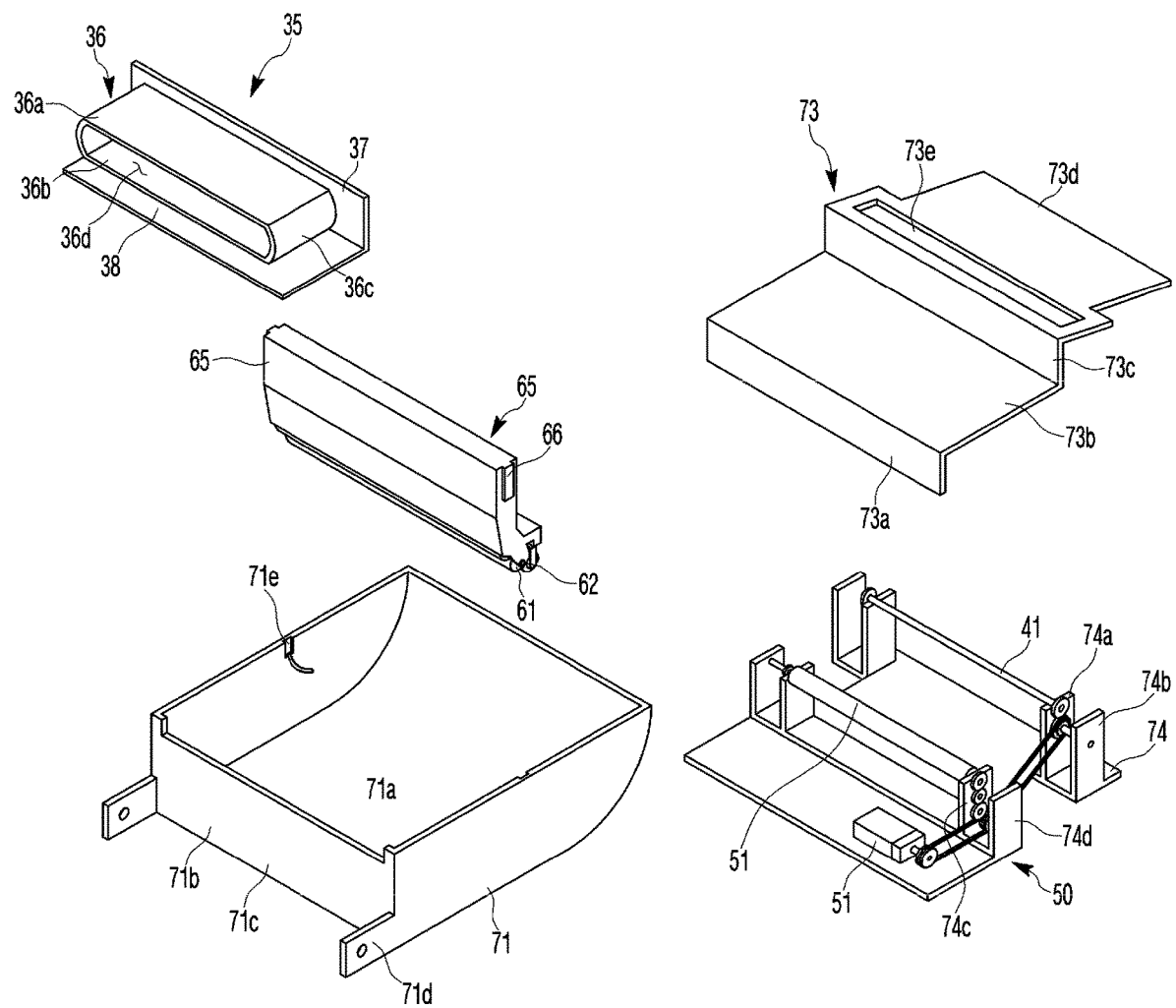
FIG. 8 is an exploded perspective view illustrating the automatic pet excrement collection device shown in FIG. 7.

As shown in FIGS. 7 and 8, the main body case 70 includes a lower case 71 configured to form an inner space having a designated size, an upper case 72 installed on the lower case 71 so as to close the upper end of the lower case 71, and an inner case 73 installed in the lower case 71 so as to divide the inner space. Further, a frame 74 may be further installed in the lower case 71.

The defecation plate 10 is formed as a flat plate having a designated size and thickness, and a guide roller 15 is rotatably installed at one end of the defecation plate 10. Preferably, the defecation plate 10 is fixed to the main body case 70 or the defecation sheet block receipt case 25 so as not to be moved. Further, an outlet 26 configured to discharge the defecation sheet 21 withdrawn from the defecation sheet block 22 therethrough is formed in one vertical plate 25b of the defecation sheet block receipt case 25. Further, the guide roller 15 which guides the defecation sheet 21 discharged from the outlet 26 to the upper surface of the defecation plate 10 is located in the upper region outside the outlet 26.

Figure 9:
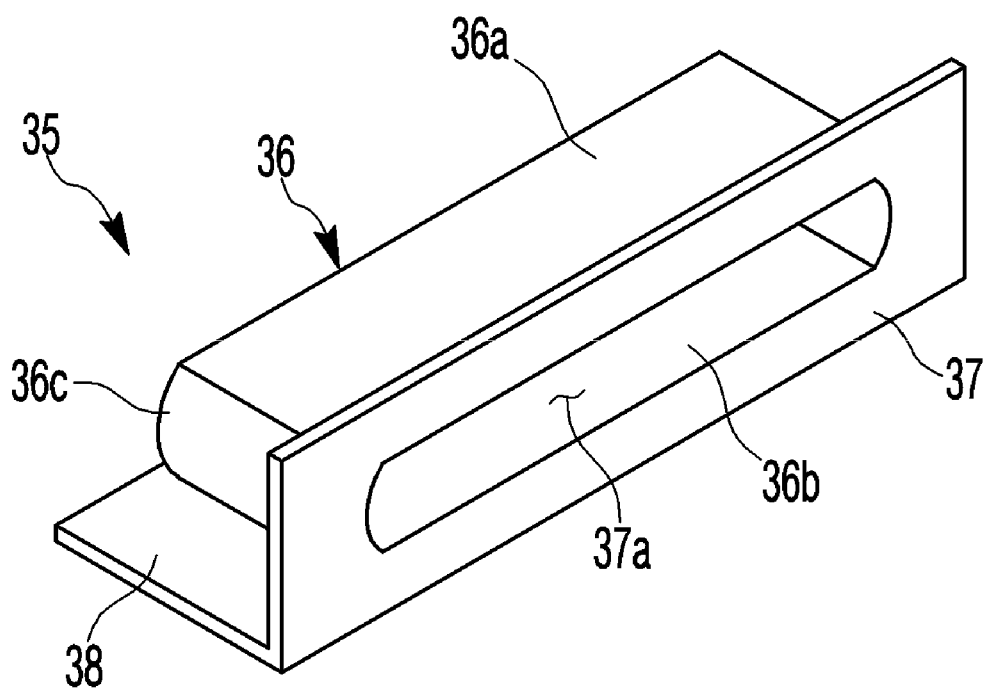
FIG. 9 is a perspective view showing one example of a vinyl tube block storage member according to the present invention.

As shown in FIG. 9, the hollow passage formation part 36 is formed to have a shape and size which can be inserted into the hollow part 33d of the vinyl tube block 32, and the receipt space configured to receive the stack 33 of the vinyl tube block 32 is formed outside the hollow passage formation part 36, and the hollow passage 36d into which the defecation sheet 21 withdrawn from the vinyl tube block 32 is inserted is formed in the hollow passage formation part 36.

Preferably, the hollow passage formation part 36 includes an upper support 36a formed to have a size and shape which can be inserted into the hollow part 33d of the vinyl tube block 32, and a lower support 36b installed to be spaced apart from the upper support 36a by a designated distance. Further, side supports 36c having a designated height are formed integrally with both side parts of the upper support 36a and the lower support 36b. Here, the side supports 36c may have a curved plane having a designated curvature. Further, the above-described hollow passage 36d is formed among the upper support 36a, the lower support 36b and the two side supports 36c. The hollow passage 36d is formed to have a sufficient size to allow the vinyl tube 31 including the defecation sheet 21 and the pet excrement 14 placed thereon to pass through the hollow passage 36d.

Therefore, when the hollow passage formation part 36 is inserted into the rear region of the hollow part 33d of the vinyl tube block 32, the upper stack part 33a of the vinyl tube block 32 is received on the upper surface of the upper support 36a, the lower stack part 33b of the vinyl tube block 32 is received on the lower surface of the lower support 36b, and side stack parts 33c of the vinyl tube block 32 are received on the outer surfaces of the two side supports 36c. Preferably, the vinyl tube block 32 is placed on the outer surface of the hollow passage formation part 36.

Further, the vinyl tube block receipt member 35 further includes a rear support plate 37 configured to support the hollow passage formation part 36. The rear support plate 37 is vertically installed at the rear ends of the upper support 36a, the lower support 36b and the side supports 36c. Further, an opening 37a is formed through the center of the rear support plate 37 so as to correspond to the hollow passage 36d. The rear support plate 37 is installed such that both side surfaces thereof are pressed against the inner surface of the lower case 71.

Further, a bottom support plate 38 spaced apart from the lower support 36b by a designated distance is installed. The rear end of the bottom support plate 38 may be integrally fixed to the rear support plate 37. Therefore, the lower stack part 33b of the vinyl tube block 32 is received between the lower support 36b and the bottom support plate 38.

A mount part 75 on which the vinyl tube block receipt member 35 is installed is formed in the lower case 71. The mount part 75 may be formed by the inner case 73 installed in the lower case 71. For example, the inner case 73 is formed of a metal or synthetic resin plate having a designated thickness, and includes a first vertical part 73a having a designated height, a horizontal part 73b bent horizontally from the upper end of the first vertical part 73a and extending to a designated length, a second vertical part 73c bent upwards from the end of the horizontal part 73b and extending to a designated distance, and an inclined part 73c extending downwards from the upper end of the second vertical part 73c so as to be inclined at a designated angle, as shown in FIG. 8.

That is, the mount part 75 is formed on the horizontal part 73b of the inner case 73. Here, the height of the first vertical part 73a of the inner case 73 allows the lower support 36b to be coplanar with the defecation plate 10, and allows the upper end of the second vertical part 73c to be coplanar with the defecation plate 10. Therefore, when the inner case 73 is installed in the lower case 71, the mount part 75 is formed on the horizontal part 73b, and an installation space in which a driving motor 51 is installed is formed under the horizontal part 73b.

Further, the winding roller 41 configured to wind the vinyl tube 31 and the defecation sheet 21 is installed in the lower case 71. Preferably, the winding roller 41 may be installed on the frame 74 installed in the lower case 71. The frame 74 includes a bottom plate 74a, and inner vertical walls 74b and 74d and outer vertical walls 74c and 74e which extend upwards from both side parts of the bottom plate 74a to a designated length, as shown in FIG. 8. Here, the inner vertical walls 74b and 74d and the outer vertical walls 74c and 74e are spaced apart from each other by a designated distance.

The winding roller 41 is installed between the two inner vertical walls 74b. Preferably, the winding roller 41 may be formed of a cylindrical paper pipe. Further, a support recess configured to rotatably support the winding roller 41 is formed in the upper end of each of the inner vertical walls 74b. Further, a plurality of gears and pulleys configured to rotate the winding roller 41 are installed between the inner vertical walls 74b and 74d and the outer vertical walls 74c and 74e.

Further, a pressing roller means 60 is installed in the lower case 71. The pressing roller means 60 is installed between the vinyl tube block receipt member 35 and the winding roller 41. The pressing roller means 60 is installed to press the vinyl tube 31 discharged rearwards through the hollow passage 36d of the vinyl tube block receipt member 35.

Figure 11:
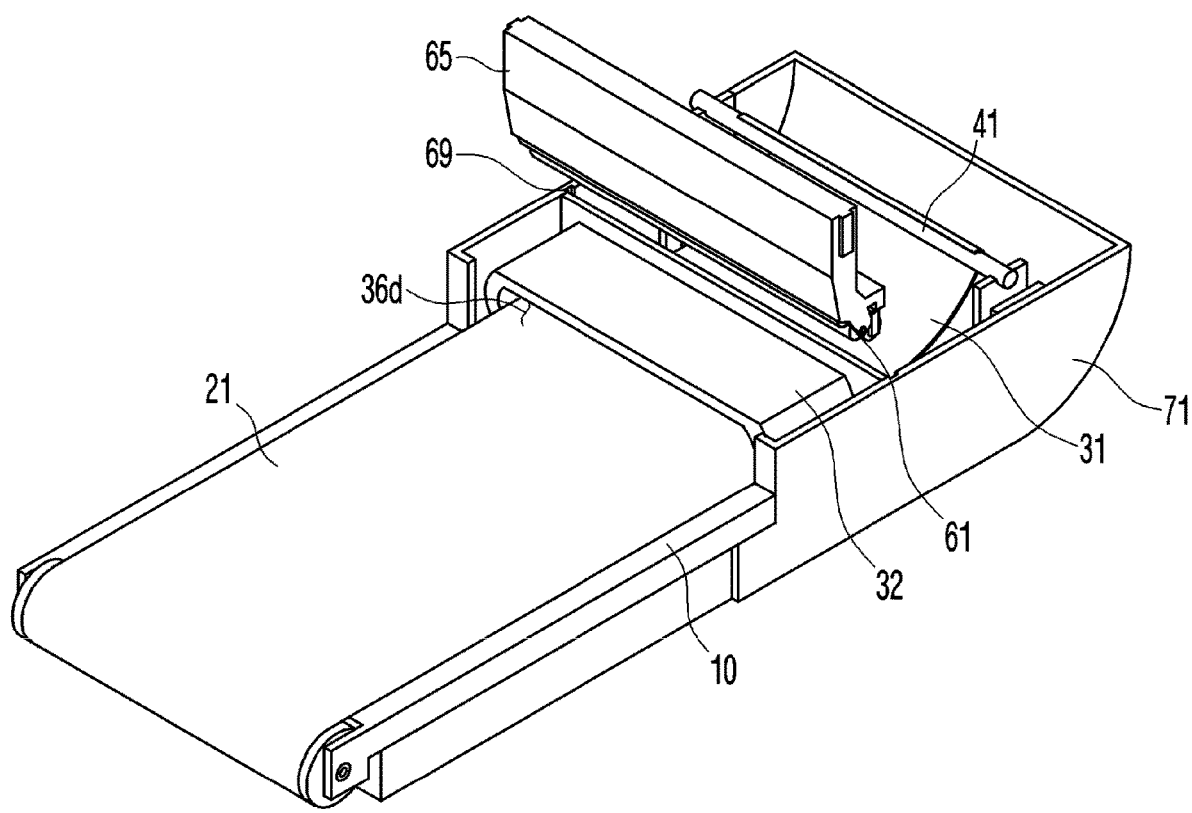
FIG. 11 is a perspective view showing a method for installing a pressing roller means according to the present invention.

As shown in FIGS. 8 and 11, the pressing roller means 60 includes a pressing roller main body 65 detachably installed in the main body case 70, an upper pressing roller 61 rotatably installed at the lower end of the pressing roller main body 65, and a lower pressing roller 62 installed to be spaced apart from the upper pressing roller 61 by a designated distance.

Preferably, the lower pressing roller 62 is rotatably installed at the two inner vertical walls 74d of the frame 74, and the upper end of the lower pressing roller 62 is exposed to the outside through an opening 73e formed in the inclined part 74d of the inner case 73 so as to correspond to the upper pressing roller 61. Therefore, when the vinyl tube 31 passes through a gap between the upper pressing roller 61 and the lower pressing roller 62, the excrement 14 inserted into the vinyl tube 31 is compressed to a designated thickness or less by a designated pressure applied by the upper pressing roller 61 and the lower pressing roller 62.

The pressing roller main body 65 is a plastic injection-molded product formed in a plate shape having a designated thickness, and both side surfaces thereof are fixed to the inner surface of the lower case Preferably, a guide protrusion 66 is formed on each of both side surfaces of the pressing roller main body 65, and guide grooves 71e corresponding to the guide protrusions 66 are formed in the inner surface of the lower case 71.

A sealing roller 63 may be further installed at the lower end of the pressing roller main body 65. The sealing roller 63 presses the vinyl tube 31 having passed through the upper pressing roller 61, thus sealing the inside of the vinyl tube 31. Preferably, the sealing roller 63 is rotatably installed at the lower end of the pressing roller main body 65 so as to apply a designated elastic force downwards. For this purpose, a designated elastic means or a solenoid may be provided on the sealing roller 63.

The driving means 50 configured to rotate the winding roller 41 and the lower pressing roller 62 is provided in the lower case 71. The driving means 50 includes a driving motor 51 and a power transmission means 52 configured to transmit rotating force of the driving motor 51.

FIG. 9 is a perspective view showing one example of the vinyl tube block receipt member 35 according to the present invention. As shown in this figure, the opening 37a is formed through the rear support plate 37. The opening 37a is formed to correspond to the hollow passage 37a of the vinyl tube block receipt member 35. Further, the lower end of the opening 37a is coplanar with the lower support 36b.

Figure 10:
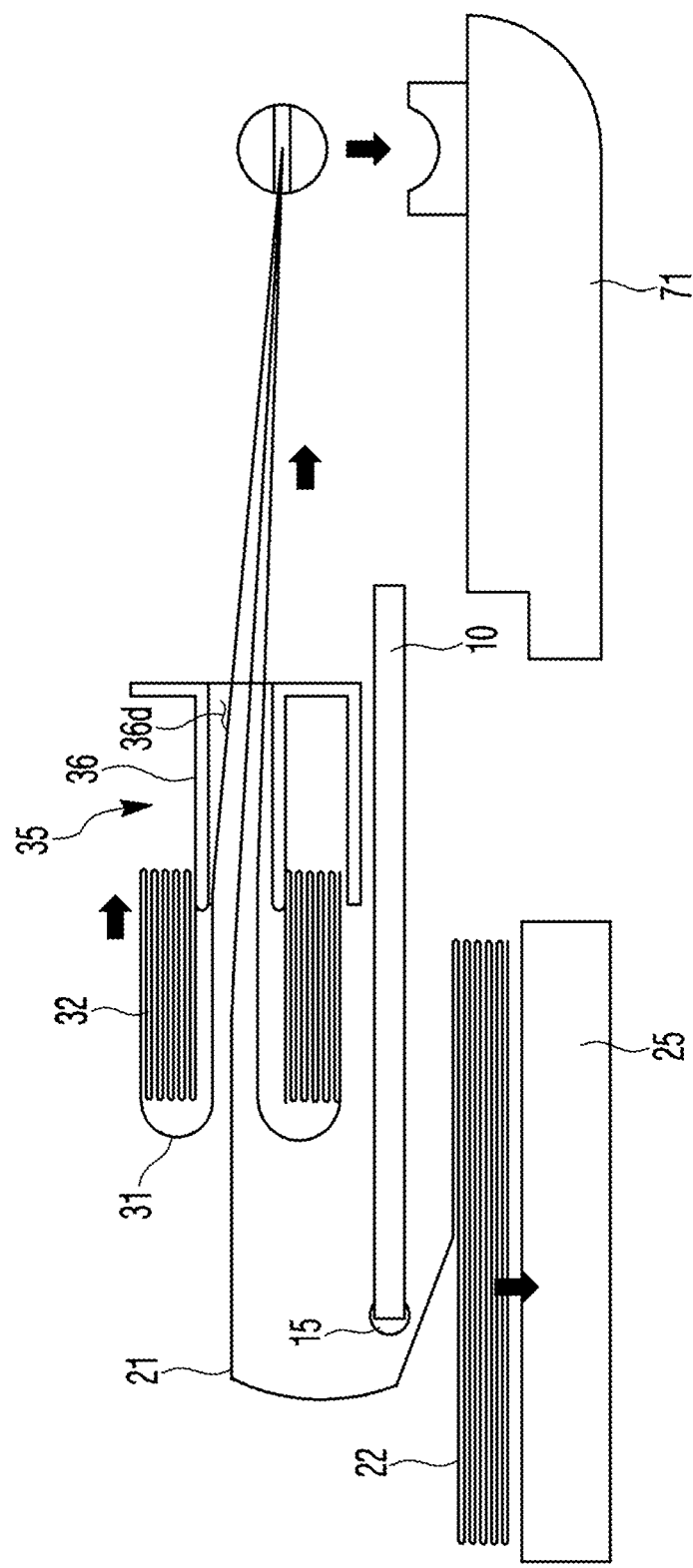
FIG. 10 is a view schematically showing a method for installing the defecation sheet block and the vinyl tube block (or cartridge) according to the present invention.

Thereafter, FIG. 10 shows a method for installing the defecation sheet block 22 and the vinyl tube block 32 (or cartridge) according to the present invention in the automatic pet excrement collection device 1. As shown in this figure, the defecation sheet block 22 is received in the defecation sheet block receipt case 25. Further, the defecation sheet 21 withdrawn from the defecation sheet block 22 is laid on the upper surface of the defecation plate 10. Thereafter, the vinyl tube block 32 is located on the outer surface of the hollow passage formation part 36 by inserting the hollow passage formation part 36 of the vinyl tube block receipt member 35 into the hollow part 33d of the vinyl tube block 32. Thereafter, the vinyl tube 31 withdrawn from the vinyl tube block 32 is inserted into the hollow passage 36d so as to pass through the hollow passage 36d. Subsequently, the front end of the defecation sheet 21 laid on the defecation plate 10 is inserted into the vinyl tube 31 passing through the hollow passage 36d. Then, the front end of the defecation sheet 21 inserted into the vinyl tube 31 is coupled to the front end of the vinyl tube 31. Further, the front ends of the vinyl tube 31 and the defecation sheet 21 are fixed to the winding roller 41 is fixed.

After the defecation sheet block 22 and the vinyl tube block 32 are respectively installed in the defecation sheet block receipt case 25, the defecation plate 10 and the vinyl tube block receipt member 35 in this way, the defecation sheet block receipt case 25 is fixed to be arranged in a row with the main body case 70, and the defecation plate 10 is fixedly installed on the upper part of the defecation sheet block receipt case 25. Further, the vinyl tube block receipt member 35 is installed in the main body case 70, and the front ends of the vinyl tube 31 and the defecation sheet 21 are fixed to the winding roller 41 rotatably installed on the frame 74, or the winding roller 41 fixed to the front ends of the vinyl tube 31 and the defecation sheet 21 is rotatably installed on the frame 74.

Figure 12:
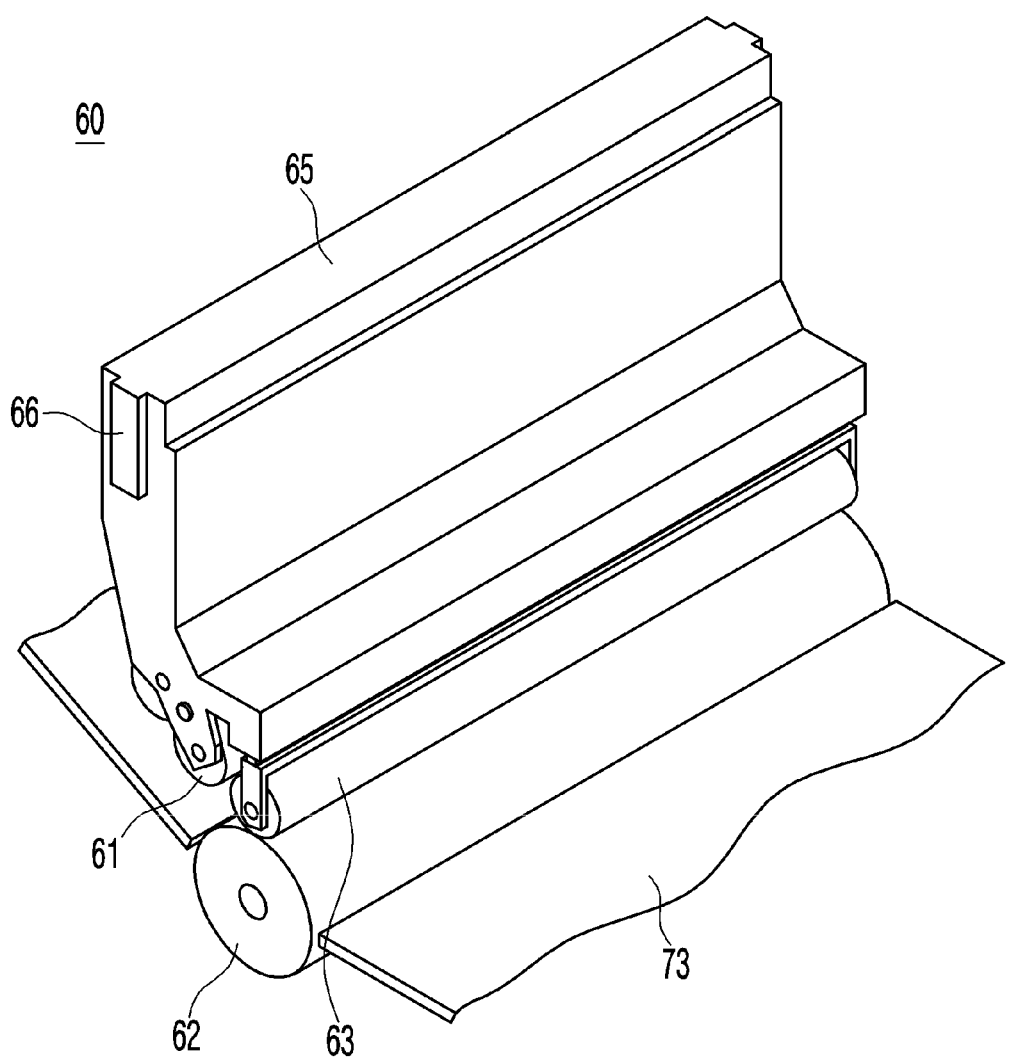
FIG. 12 illustrates views showing the functions of the pressing roller means according to the present invention.

Thereafter, as shown in FIGS. 11 and 12, the pressing roller main body 65 is inserted into the lower case 71 so that the upper pressing roller 61 presses the vinyl tube 31. Then, as shown in FIG. 12, the upper pressing roller 61 is installed to be spaced upwards apart from the lower pressing roller 62 by a designated height, and the sealing roller 63 is installed to be pressed against the outer circumferential surface of the lower pressing roller 62 or to be pressed against the inclined part 73d of the inner case 73. The guide protrusions 66 formed on both surfaces of the pressing roller main body 65 are fixedly inserted into the guide grooves 71e formed in the lower case 71. Further, a stepped part 67 is formed at the upper end of the pressing roller main body 65 so as to be coupled to the lower end of the upper case 73.

Figure 13A:
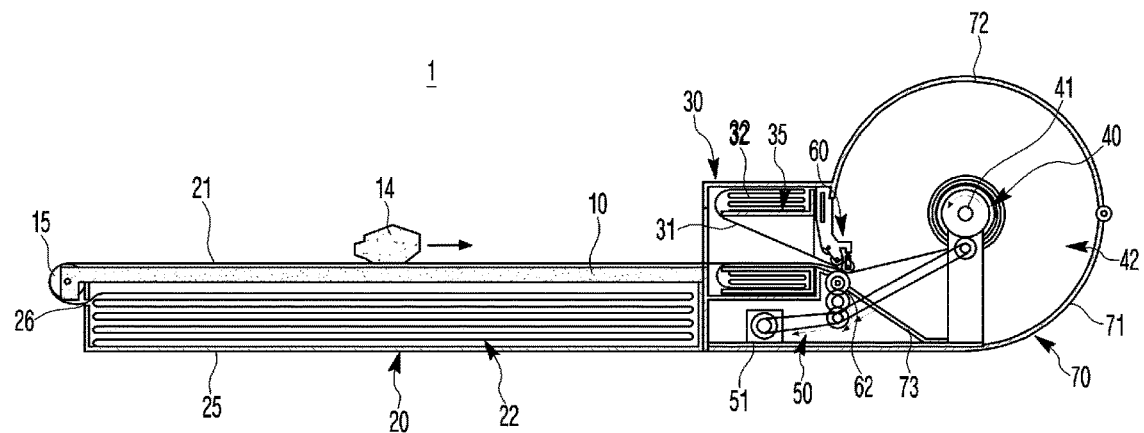
FIGS. 13A-13C show cross-sectional views illustrating the functions of the automatic pet excrement collection device according to the present invention.

Hereafter, the functions of the automatic pet excrement collection device 1 according to the present invention will be described with reference to FIGS. 13A-13C. First, as shown in FIG. 13A, the defecation sheet 21 withdrawn from the defecation sheet block 22 is laid on the upper surface of the defecation plate 10, and the defecation sheet 21 is withdrawn from the defecation sheet block 22 and is then inserted into the vinyl tube 31 inserted into the hollow passage 36d of the vinyl tube block receipt member 35. Further, the front ends of the vinyl tube 31 and the defecation sheet 21 inserted thereinto are fixed to the winding roller 41.

Under the above state, after a pet has defecated on the defecation plate 10 and has then come down from the defecation plate 10, a controller, which is not shown, installed on the main body case 70 detects this situation through a sensor, which is not shown, and then operates the driving motor 51. When the driving motor 51 is operated, the rotating force thereof is transmitted to the winding roller 41 and the lower sing roller 62 through the power transmission means 52. Then, the winding roller 41 is rotated in the horizontal direction, and thus winds the vinyl tube 31 and the defecation sheet 21 on the outer circumferential surface thereof, and simultaneously pulls the vinyl tube 31 and the defecation sheet Thereby, the defecation sheet 21 is further withdrawn from the defecation sheet block 22 and is laid on the upper surface of the defecation plate 10, and simultaneously, a part of the defecation sheet 21 laid on the upper surface of the defecation plate 10 and the excrement 14 placed on the part of the defecation sheet 21 are horizontally moved and inserted into the vinyl tube 31 withdrawn from the vinyl tube block 32.

The vinyl tube 31 withdrawn from the vinyl tube block 32 and the defecation sheet 21 inserted thereinto pass through the hollow passage 36d of the vinyl tube block receipt member 35 and are discharged rearwards. The vinyl tube 31 transferred rearwards from the vinyl tube block receipt member 35 is compressed while passing through the gap between the lower pressing roller 62 and the upper pressing roller 61. Here, the lower pressing roller 62 and the upper pressing roller 61 are spaced apart from each other by a designated dis e, and thus, the pet excrement 14 passing through the gap therebetween is compressed to a designated thickness or less.

Figure 13B:
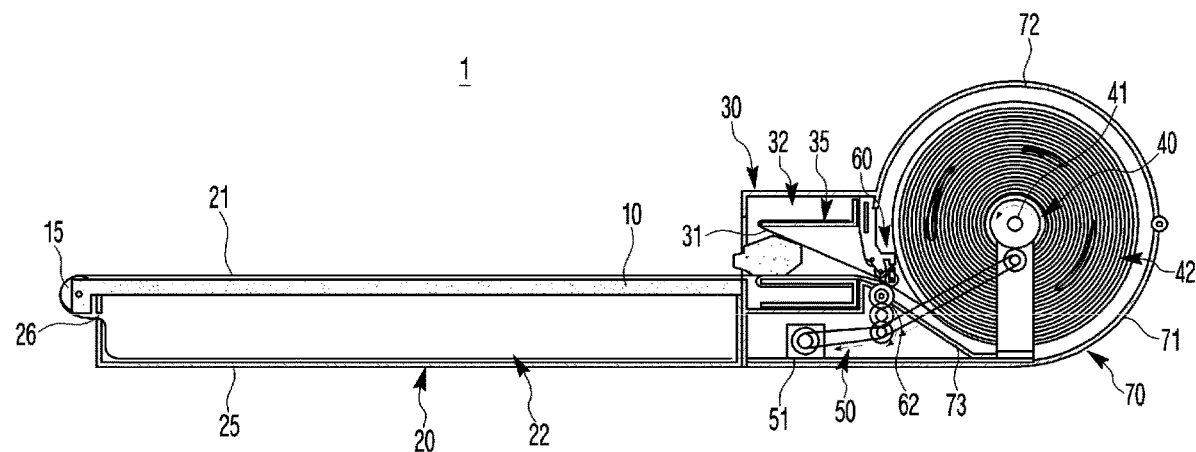

Subsequently, as shown in FIG. 13B, the vinyl tube 31, and the defecation sheet 21 and the pet excrement 14 inserted thereinto are wound on the outer circumferential surface of the winding roller 41, thereby forming the vinyl tube winding roll 42. When the defecation sheet 21 is moved by a designated length, the controller, which is not shown, installed on the main body case 70 detects this situation through the sensor, which is not shown, and then stops operation of the driving motor 51. Here, the sealing roller 73 presses the vinyl tube 31, and thus prevents a smell of the excrement 14 wound on the winding roller 41 from leaking.

Figure 13C:
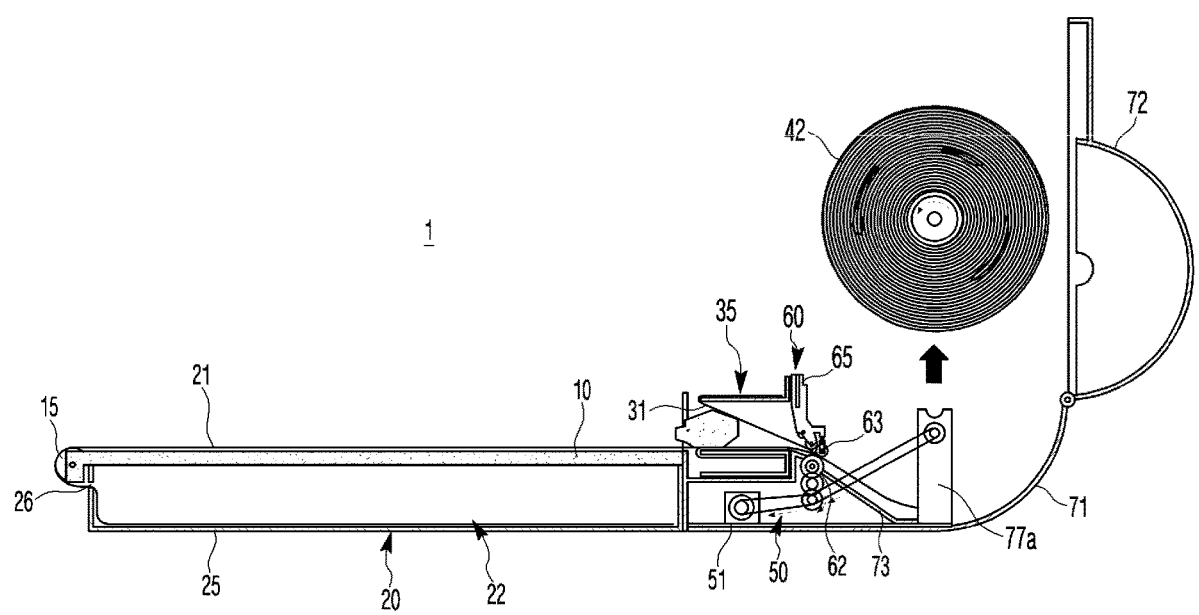

Subsequently, as shown in FIG. 13C, when the defecation sheet 21 and the vinyl tube 31 are all depleted due to repetitive use for a designated time and the diameter of the vinyl tube winding roll 42 reaches a designated size, the upper case 73 is opened and the vinyl tube winding roll 42 is removed. Here, the winding roller 41 is discarded together with the vinyl tube winding roll 42. Further, the separated vinyl tube winding roll 42 may be discarded in the state of being put into a garbage bag. Here, a sensor, which is not shown, configured to detect the amount of the remainder of the defecation sheet 21 or the vinyl tube 31 or to detect the diameter of the vinyl tube winding roll 42 may be provided in the case main body 70.

As described above, the automatic pet excrement collection device 1 according to the present invention may omit cumbersomeness, such as placing of pet excrement into a toilet, and is thus convenient to use and is hygienic without leaking the excrement and a smell thereof to the outside, because the defecation sheet 21 may be rapidly replaced whenever a pet defecates for a designated period of time, and the contaminated defecation sheet 21 and excrement 14 are inserted into the vinyl tube 31 and are then wound together with the vinyl tube 31.

Figure 14:
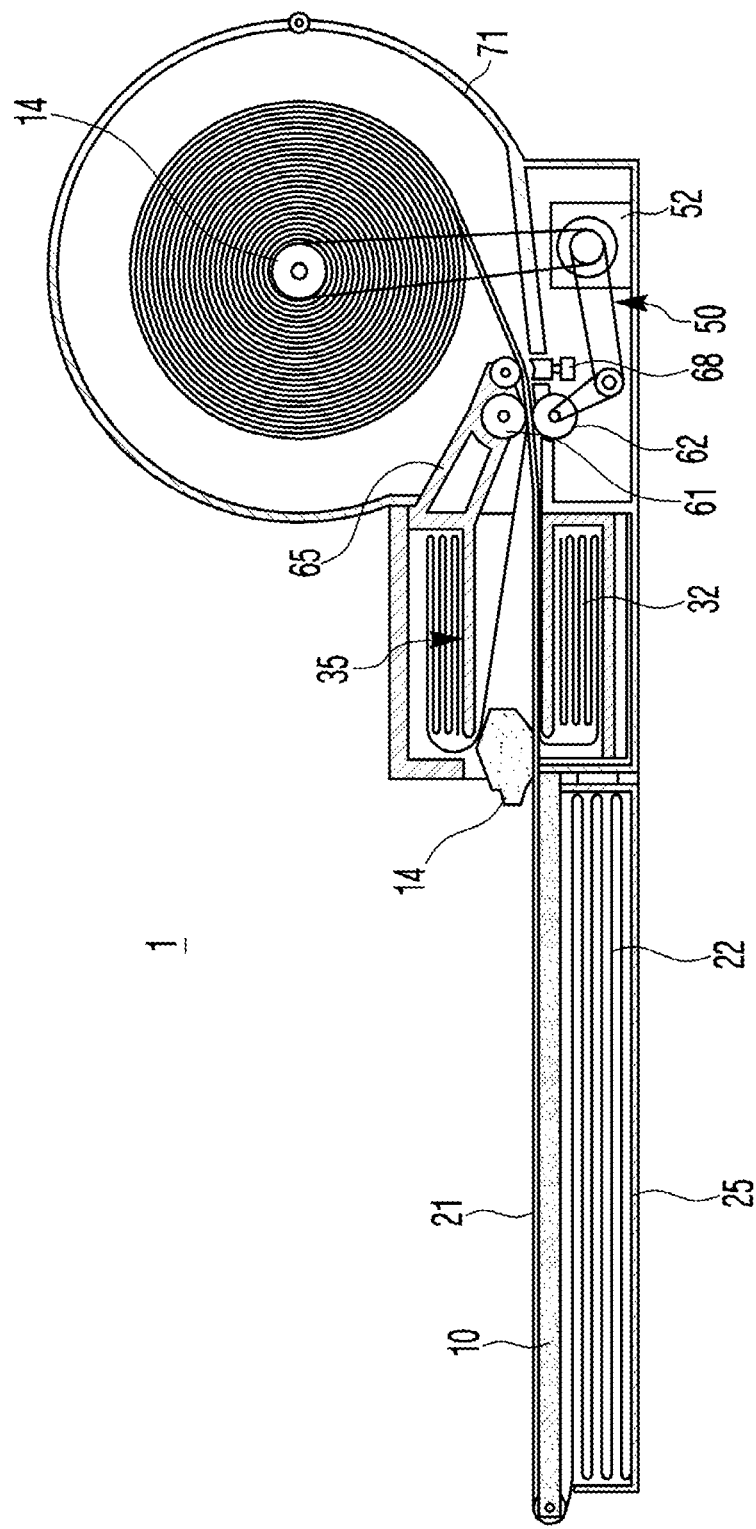
FIGS. 14 to 18 are cross-sectional views showing various embodiments of the automatic pet excrement collection device according to the present invention.

FIG. 14 is a cross-sectional view showing yet another embodiment of the automatic pet excrement collection device 1 according to the present invention. As shown in this figure, a vinyl tube block receipt member 35 and a pressing roller main body 65 are integrated into one body. That is, when the pressing roller main body 65 is formed integrally with the rear end of the vinyl tube block receipt member 35, both the vinyl tube block receipt member 35 and the pressing roller main body 65 may be simultaneously installed in a lower case 71, and thus, it is easy to install the vinyl tube block receipt member 35 and the pressing roller main body 65, and the pressing roller main body 65 is not easily separated from the lower case 71. Here, the pressing roller main body 65 may be inclined at a designated angle so as to be easily installed.

Figure 15:
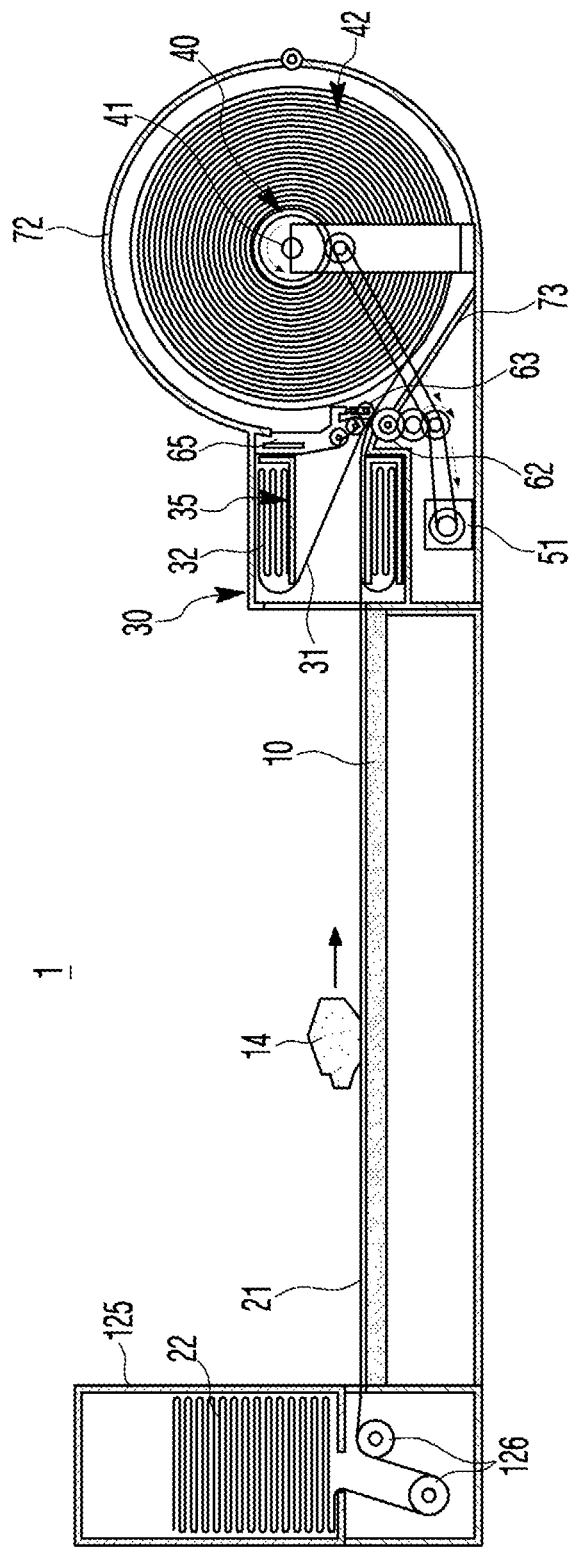

FIG. 15 is a cross-sectional view showing yet another embodiment of the automatic pet excrement collection device 1 according to the present invention. As shown in this figure, a defecation sheet supply unit 120 is provided on one end of a defecation plate 10. That is, the defecation sheet supply unit 120 is installed vertically on one end of the defecation plate 10, and includes a defecation sheet block receipt case 125 configured to receive a defecation sheet block 122 formed by folding and then vertically stacking the defecation sheet 21. An opening and a lid may be installed at one side of the defecation sheet block receipt case 125. Further, an outlet 126 configured to discharge the defecation sheet 21 therethrough is formed in the bottom of the defecation sheet block receipt case 125, and guide rollers 127 configured to supply the defecation sheet 21 withdrawn from the defecation sheet block 122 to the upper surface of the defecation plate 10 are installed under the outlet 126.

Figure 16:
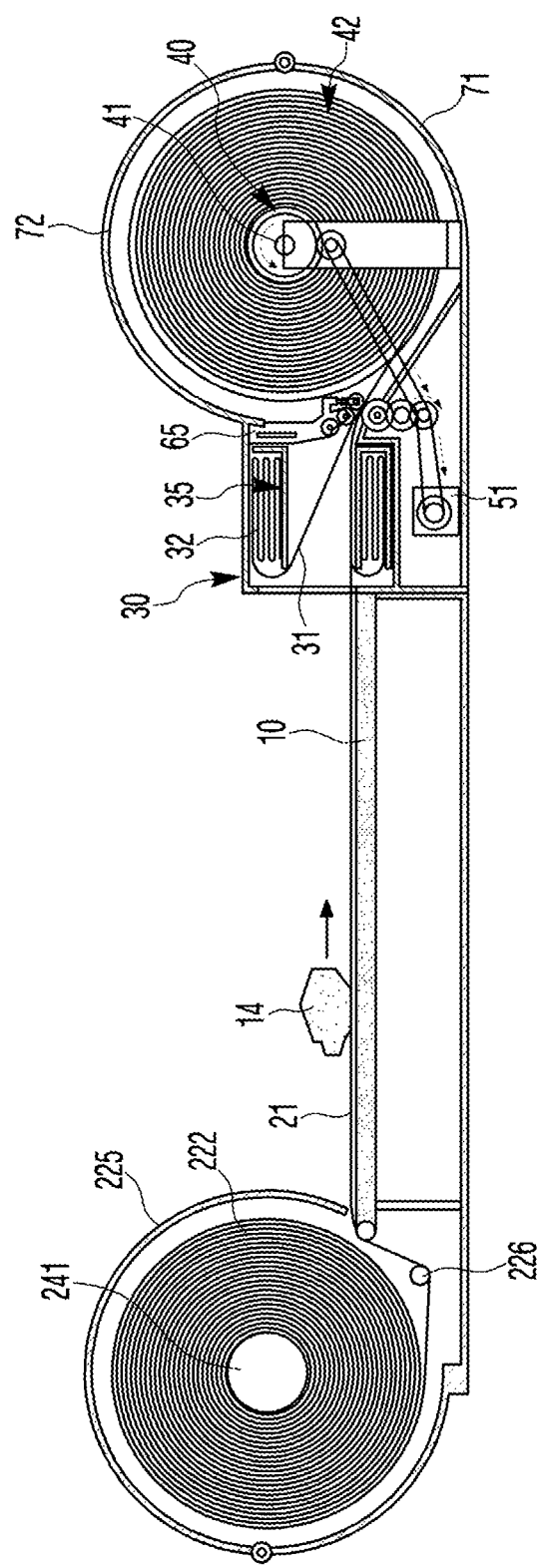

FIG. 16 is a cross-sectional view showing yet another embodiment of the automatic pet excrement collection device 1 according to the present invention. As shown in this figure, a defecation sheet supply unit 220 is provided on one end of a defecation plate 10. The defecation sheet supply unit 220 includes a cylindrical defecation sheet block receipt case 225 installed on one end of the defecation plate 10 and configured to receive a defecation sheet supply roll 222 in which a defecation sheet 21 is wound on the outer circumferential surface of a supply roll 241. An outlet 226 configured to discharge the defecation sheet 21 therethrough is formed at the lower end of the defecation sheet block receipt case 225, and a guide roller 227 configured to supply the defecation sheet 21 withdrawn from the defecation sheet supply roll 222 to the upper surface of the defecation plate 10 are installed under the outlet 226.

Figure 17:
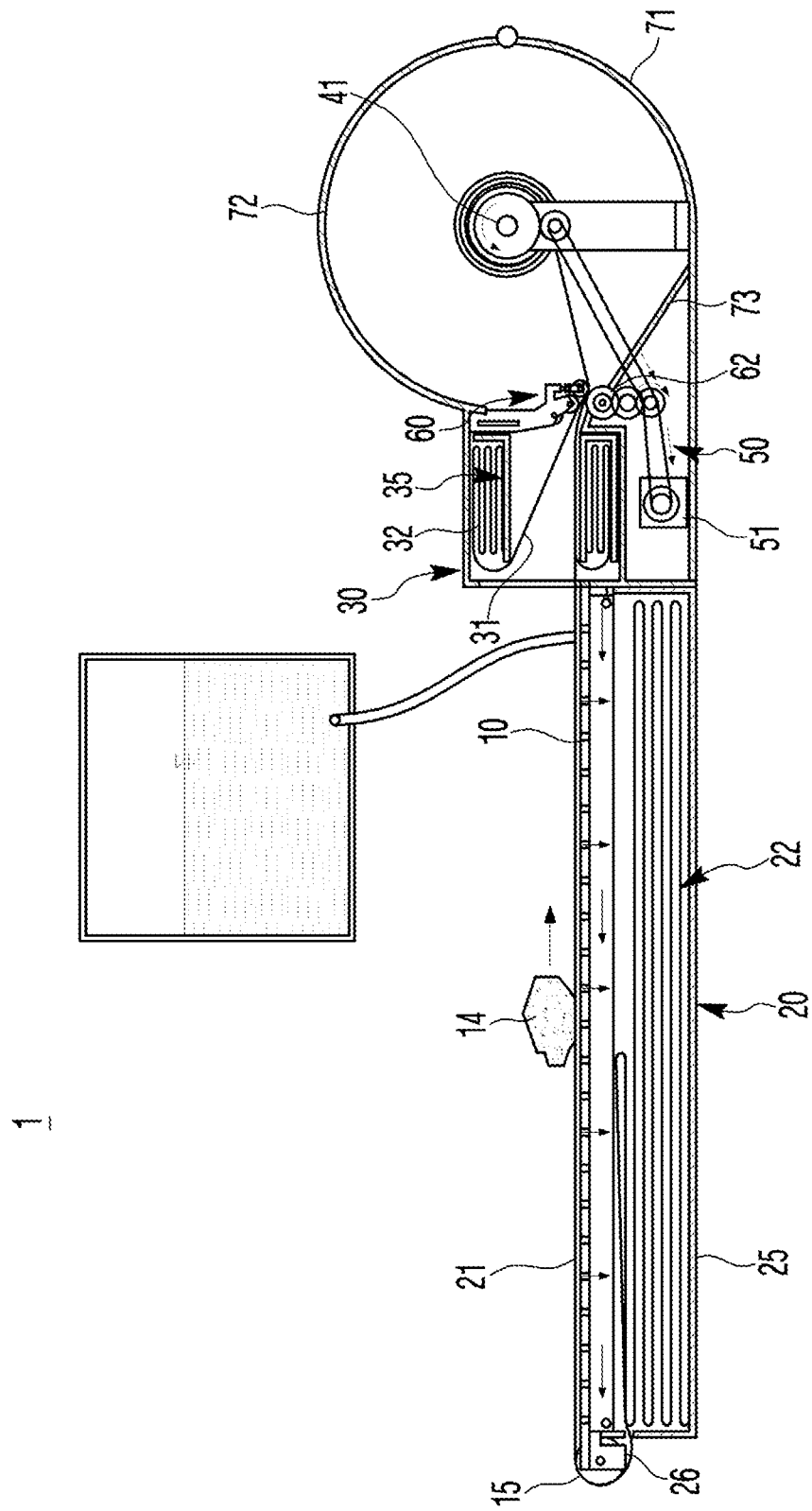

FIG. 17 is a cross-sectional view showing yet another embodiment of the automatic pet excrement collection device 1 according to the present invention. As shown in this figure, a defecation plate 10 is a porous plate, and a urine collection box 19 configured to collect pet urine is provided under the defecation plate 10. Further, a washing water supply means 80 configured to supply washing water to the urine collection box 19 is further provided at one side of the defecation plate.

That is to say, this embodiment allow pet urine and feces to be divisionally collected, and includes the porous defecation plate 10 formed to have a designated size and configured such that a plurality of pores is vertically formed therethrough, a defecation sheet supply unit 20 configured to continuously supply the water-permeable defecation sheet 21 to the upper surface of the porous defecation plate 10, the urine collection box 19 installed under the porous defecation plate 10 and configured to collect pet urine flowing down through the water-permeable defecation sheet 21 and the porous defecation plate 10, and the washing water supply means 80 configured to supply washing water to the urine collection box 19. Preferably, the washing water supply means 80 includes a water storage configured to store washing water, and a hose configured to supply the washing water in the water storage to the urine collection box 19. Further, an electric valve configured to control the flow of washing water is provided on the hose.

Figure 18:
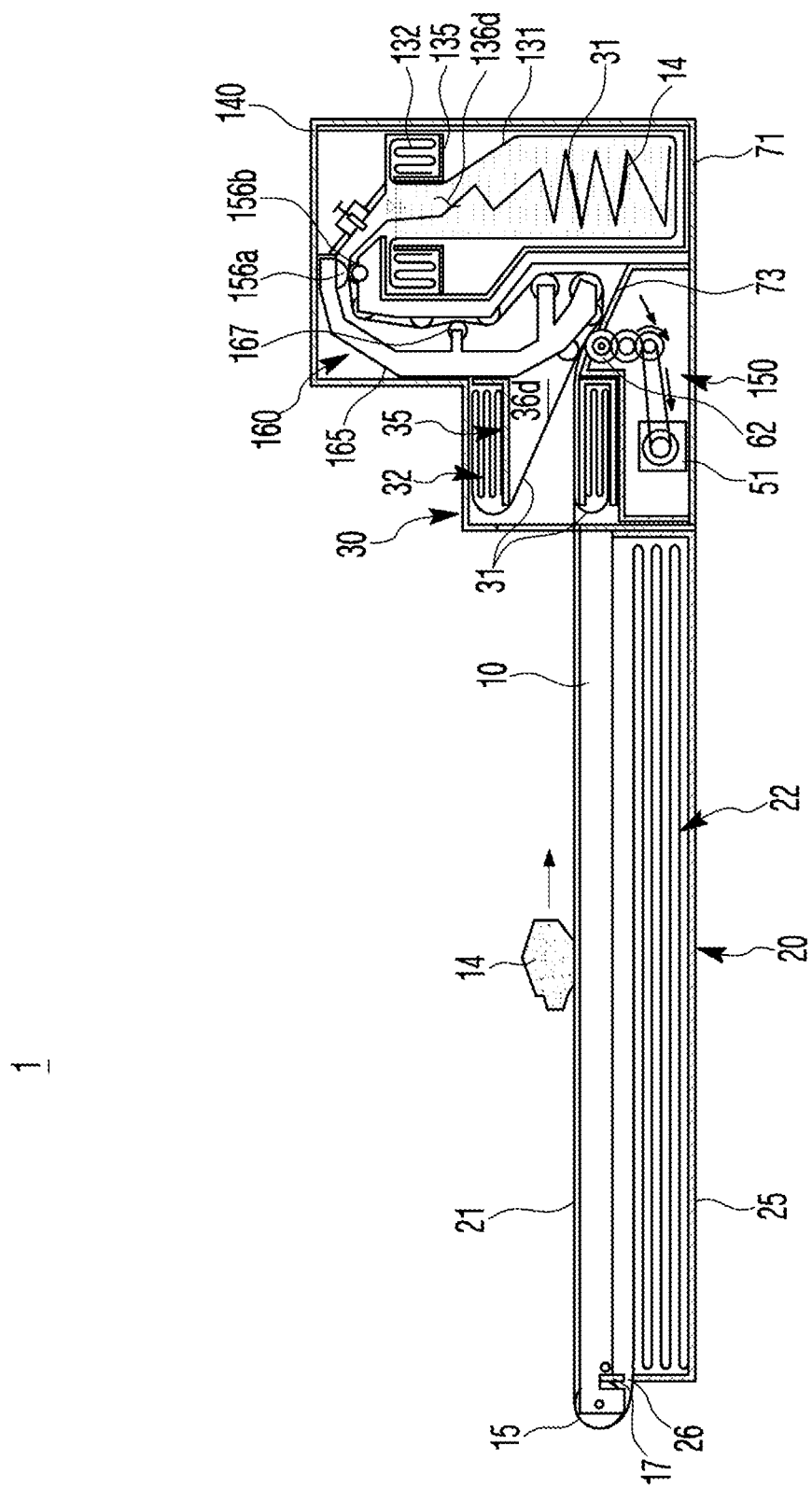

FIG. 18 is a cross-sectional view showing yet another embodiment of the automatic pet excrement collection device 1 according to the present invention. As shown in this figure, this embodiment includes a defecation plate 10 formed to have a designated size, a defecation sheet supply unit 20 configured to continuously supply the defecation sheet 21 to the upper surface of the defecation plate 10, a vinyl tube supply unit 30 configured to continuously supply the vinyl tube 31 installed such that the contaminated defecation sheet 21 discharged from the defecation plate 10 can be inserted thereinto, a transfer means 150 configured to transfer the vinyl tube 31 discharged from the vinyl tube supply unit 30, and the contaminated defecation sheet 21 and pet excrement 14 inserted into the vinyl tube 30 upwards to a designated height, a pressing and guiding means 160 configured to guide the vinyl tube 31, and the contaminated defecation sheet 21 and the pet excrement 14 inserted into the vinyl tube 30, transferred by the transfer means 150, so as to smoothly transfer the vinyl tube 30, the contaminated defecation sheet 21 and the pet excrement 14, and simultaneously to press the excrement 14 inserted into the vinyl tube 31 so as to compress the excrement 14 to a designated thickness, a vinyl tube collection box 133 configured to collect the vinyl tube 31 transferred by the transfer means 150 and a garbage bag 131 installed in the vinyl tube collection box 133 so as to collect the vinyl tube 31.

Preferably, the transfer means 150 serves to transfer the vinyl tube 30 discharged from the vinyl tube supply unit 30, and the contaminated defecation sheet 21 and the pet excrement inserted into the vinyl tube 31 upwards to the designated height and then to put the vinyl tube 30, the defecation sheet 21 and the pet excrement 14 into the vinyl tube collection box 133, and includes the above-described driving motor 51 and power transmission means 52 and transfer rollers 156 including two rollers 156a and 156b rotatably installed in a main body case 70 and rotated by the power transmission means 51.

The transfer rollers 156 include an upper transfer roller 156a and a lower transfer roller 156b installed so as to be located above the vinyl tube collection box 133 or the garbage bag 131. Therefore, the upper transfer roller 156a and the lower transfer roller 156b are rotated in opposite directions, and thus transfer the vinyl tube 31 passing through a gap therebetween by pressure so as to put the vinyl tube 31 into the vinyl tube collection box 133.

The pressing and guiding means 160 serves to guide the vinyl tube 31 and the contaminated defecation sheet 21 and the pet excrement 14 inserted into the vinyl tube 30, transferred by the transfer means 150 by pressure, so as to smoothly transfer the vinyl tube 30, the contaminated defecation sheet 21 and the pet excrement 14, and simultaneously to press the excrement 14 inserted into the vinyl tube 31 so as to compress the excrement 14 to a designated thickness, and includes a guide partition 168 vertically installed in the main body case 70 and configured such that a plurality guide rollers 169 is rotatably installed on the guide partition 168, and a pressing roller main body 156 detachably installed in the main body case 70 so as to correspond to the guide partition 168.

The guide partition 168 is vertically installed between the vinyl tube supply unit 30 and the vinyl tube collection box 133, the lower end of the guide partition 168 is fixed to the lower case 71, and the plurality of rollers 169 is rotatably installed at the upper end and the middle portion of the guide partition 168. Particularly, the lower transfer roller 156b is rotatably installed at the upper end of the guide partition 168.

The pressing roller main body 156 is detachably installed between the vinyl tube supply unit 30 and the guide partition 168, is formed as a plastic injection-molded product having a gentle "C"-shape, and is installed corresponding to the guide partition 168. A upper pressing roller 61 is rotatably installed at the lower end of the pressing roller main body 156, and the upper transfer roller 156a corresponding to the lower transfer roller 156b is rotatably installed at the upper end of the pressing roller main body 156. Further, a sealing roller 63 is installed at the lower end of the pressing roller main body 156 so as to come into elastic contact with the upper surface of the inner case 73, and a plurality of guide rollers 167 configured to guide the vinyl tube 63 transferred along the rollers of the guide partition 168 is rotatably installed at the middle portion of the pressing roller main body 156.

Therefore, when the upper transfer roller 156a and the lower transfer roller 156b are rotated, the vinyl tube 31 and the defecation sheet 21 interposed therebetween are transferred rearwards and pulled rearwards simultaneously, and thereby, the defecation sheet 21 is withdrawn from the defecation sheet block 22, and the vinyl tube 31 is withdrawn from the vinyl tube block 32. Thereafter, the vinyl tube 31, and the defecation sheet 21 and the pet excrement 14 inserted into the vinyl tube 31, which are discharged rearwards through the hollow passage 36d of the vinyl tube block receipt member 35, pass through the gap between the upper pressing roller 61 and the lower pressing roller 61, and thus, the pet excrement 41 is compressed to a designated thickness or less.

Subsequently, the vinyl tube 31, and the defecation sheet 21 and the pet excrement 14 inserted into the vinyl tube 31 are transferred upwards along the plurality of guide rollers 167 and 169 installed on the pressing roller main body 156 and the guide partition 168. Further, the vinyl tube and the defecation sheet 21 and the pet excrement 14 inserted into the vinyl tube 31 are discharged rearwards by the upper transfer roller 156a and the lower transfer roller 156b.

The vinyl tube collection box 133 is formed in the shape of a box, the upper surface of which is opened, and is installed under the upper transfer roller 156a and the lower transfer roller 156b. Preferably, a door is installed on the vinyl tube collection box 133 so as to discharge the vinyl tube 31 loaded in the vinyl tube collection box 133. The garbage bag 131 is installed in the vinyl tube collection box 133. The inlet of the garbage bag 131 is fixed to the opening of the vinyl tube collection box 133, and is opened so that the vinyl tube 31 discharged by the transfer rollers 165 may be inserted into the inlet of the garbage bag 131.

As shown in this figure, the garbage bag 131 may be formed in a tube type, and a garbage bag block receipt member 135 which receives a garbage bag block 132 configured such that the garbage bag 131 is folded at every fixed length in zigzag and is laterally stacked so as to continuously supply the garbage bag 131 is installed above the vinyl tube collection box 133. Therefore, the garbage bag 131 withdrawn from the garbage bag block 132 is discharged to the vinyl tube collection box 133 through a hollow passage 136d formed at the center of the garbage bag block receipt member 135. Further, the lower end of the garbage bag 131 inserted into the vinyl tube collection box 133 may be tied up to be sealed.

Further, a cutting means 185 configured to cut the vinyl tube 31 and the defecation sheet 21 inserted thereinto may be further provided between the transfer means 150 and the vinyl tube collection box 133. The cutting means 185 may include a blade. Therefore, when the garbage bag 131 is filled with the vinyl tube 131, the vinyl tube 131 and the defecation sheet 21 inserted thereinto are cut using the blade. Thereafter, the upper end of the garbage bag 131 may be cut using a separate blade and may then be tied up, and the garbage gag 131 may be discharged.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

The present invention provides an automatic pet excrement collection device which automatically collects excrement of a pet raised indoors and a defecation sheet contaminated with the pet excrement, and may thus be helpfully used in the pet industry.

The invention claimed is:

1. An automatic pet excrement collection device comprising:
   a defecation plate formed to have a designated size;
   a defecation sheet discharged from one side to a remaining side of the defecation plate so as to be laid on an upper surface of the defecation plate;
   a defecation sheet supply unit configured to continuously supply the defecation sheet toward the upper surface of the defecation plate;
   a main body case coupled to the remaining side of the defecation plate and configured to form an inner space having a designated size;
   a vinyl tube block installed in the inner space of the main body case, comprising an upper stack part configured such that an upper sheet of a vinyl tube is folded at every fixed length in zigzag and is vertically stacked, a lower stack part configured such that a lower sheet of the vinyl tube is folded at every fixed length in zigzag and is vertically stacked, and side stack parts configured such that side sheets of the vinyl tube are folded at every fixed length in zigzag and are vertically stacked so as to continuously supply the vinyl tube comprising the upper sheet, the lower sheet, and the side sheets and configured such that the defecation sheet discharged from defecation plate is inserted thereinto, and configured to form a hollow part among the upper stack part, the lower stack part and the side stack parts so that the vinyl tube withdrawn from the upper stack part, the lower stack part and the side stack parts is withdrawn rearwards through the hollow part;

a vinyl tube supply unit comprising a hollow passage formation part configured to support the upper stack part, the lower stack part and the side stack parts of the vinyl tube block, inserted into the hollow part from behind the vinyl tube block so that an inlet of the vinyl tube withdrawn from the vinyl tube block and discharged rearwards through the hollow part is opened toward the defecation plate by a designated height and thus the defecation sheet and pet excrement placed on an upper surface thereof are inserted into the vinyl tube, and configured to form a hollow passage in the hollow passage formation part so that the vinyl tube passes through the hollow passage; and a winding roller installed behind the vinyl tube supply unit to be rotatable in a horizontal direction, and configured such that a front end of the vinyl tube supplied rearwards through the hollow passage of the vinyl tube supply unit and a front end of the defecation sheet inserted into the vinyl tube are fixed to an outer circumferential surface of the winding roller so as to wind the vinyl tube, and the defecation sheet and the pet excrement inserted thereinto on the outer circumferential surface of the winding roller.

2. The automatic pet excrement collection device according to claim 1, wherein the defecation sheet supply unit comprises a defecation sheet block configured such that the defecation sheet is folded at every fixed length in zigzag and is vertically stacked, and a defecation sheet block receipt case configured to receive the defecation sheet block.

3. The automatic pet excrement collection device according to claim 1, wherein the defecation sheet supply unit comprises a defecation sheet supply roll formed by winding the defecation sheet around a supply roll, and a defecation sheet supply roll receipt case configured to receive the defecation sheet block.

4. The automatic pet excrement collection device according to claim 2, wherein the defecation sheet block receipt case is installed horizontally under the defecation plate.

5. The automatic pet excrement collection device according to claim 2, wherein the defecation sheet is installed vertically on the one side of the defecation plate.

6. The automatic pet excrement collection device according to claim 2, wherein the vinyl tube supply unit comprises a vinyl tube block configured such that a vinyl tube block receipt member receives the vinyl tube block.

7. The automatic pet excrement collection device according to claim 6, wherein both sides of the upper sheet and the lower sheet are connected to each other, and the side stack parts formed at both sides of the upper stack part and the lower stack part, the hollow part is configured to have a sufficient size to allow the vinyl tube and the defecation sheet to pass therethrough.

8. The automatic pet excrement collection device according to claim 7, wherein the defecation sheet discharged from the upper surface of the defecation plate is inserted into the vinyl tube withdrawn from the stack and passing through the hollow part, and is coupled to the front end of the vinyl tube after passing through the hollow part together with the vinyl tube.

9. The automatic pet excrement collection device according to claim 8, wherein the vinyl tube block receipt member comprises the hollow passage formation part.

10. The automatic pet excrement collection device according to claim 9, wherein the hollow passage formation part comprises an upper support configured to receive and support the upper stack part of the vinyl tube block, a lower support configured to receive and support the lower stack part, and side supports configured to receive and support the side stack parts, and the hollow passage is formed among the upper support, the lower support and the side supports so as to have a sufficient size to allow the defecation sheet to pass therethrough.

11. The automatic pet excrement collection device according to claim 1, further comprising a pressing roller means configured to press the vinyl tube discharged rearwards through the vinyl tube supply unit so as to compress the pet excrement placed in the vinyl tube.

\* \* \* \* \*